(12) United States Patent
Fei et al.

(10) Patent No.: US 10,684,943 B2
(45) Date of Patent: Jun. 16, 2020

(54) GENERATING EXECUTABLE TEST AUTOMATION CODE AUTOMATICALLY ACCORDING TO A TEST CASE

(71) Applicant: EMC IP Holding Company LLC, Hopkinton, MA (US)

(72) Inventors: Peng Fei, Chengdu (CN); Zhongyi Zhou, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 172 days.

(21) Appl. No.: 16/115,409

(22) Filed: Aug. 28, 2018

(65) Prior Publication Data
US 2020/0019492 A1 Jan. 16, 2020

(30) Foreign Application Priority Data
Jul. 12, 2018 (CN) .......................... 2018 1 0765680

(51) Int. Cl.
*G06F 11/36* (2006.01)
*G06F 9/455* (2018.01)
*G06K 9/62* (2006.01)
*G06N 20/00* (2019.01)

(52) U.S. Cl.
CPC ...... *G06F 11/3684* (2013.01); *G06F 9/45512* (2013.01); *G06K 9/6218* (2013.01); *G06K 9/6256* (2013.01); *G06K 9/6278* (2013.01); *G06N 20/00* (2019.01)

(58) Field of Classification Search
None
See application file for complete search history.

(56) References Cited

U.S. PATENT DOCUMENTS

2013/0097586 A1* 4/2013 Chandra ............. G06F 11/3684 717/124
2016/0210225 A1* 7/2016 Champlin-Scharff ...................... G06F 11/3684
2018/0225190 A1* 8/2018 Nagpal ................. G06F 11/368

OTHER PUBLICATIONS

Thummalapenta et al. "Automating test automation," 2012 34th International Conference on Software Engineering (ICSE), Zurich, 2012, pp. 881-891 Retrieved on May 7, 2020. Retrieved from the Internet:URL<https://ieeexplore.ieee.org/stamp/stamp.jsp?tp=&arnumber=6227131> (Year: 2012).*

* cited by examiner

*Primary Examiner* — S. Sough
*Assistant Examiner* — Cheneca Smith
(74) *Attorney, Agent, or Firm* — Staniford Tomita LLP

(57) ABSTRACT

A mapping is created between test steps from existing test cases and code snippets from existing automated test scripts. The code snippets are clustered into categories. The test steps are refined to generate training word segments. A new manual test case to automate is received. New test steps from the new manual test case are refined to generate new word segments. Probabilities are calculated for the categories, each probability indicating a likelihood that a new test step belongs in a particular category, and being based on a training word segment associated with the particular category, and a new word segment derived from the new test step. The new test step is mapped to a code snippet from a category having the highest probability. The probability calculation and code snippet mapping is repeated for each other new test step.

18 Claims, 18 Drawing Sheets

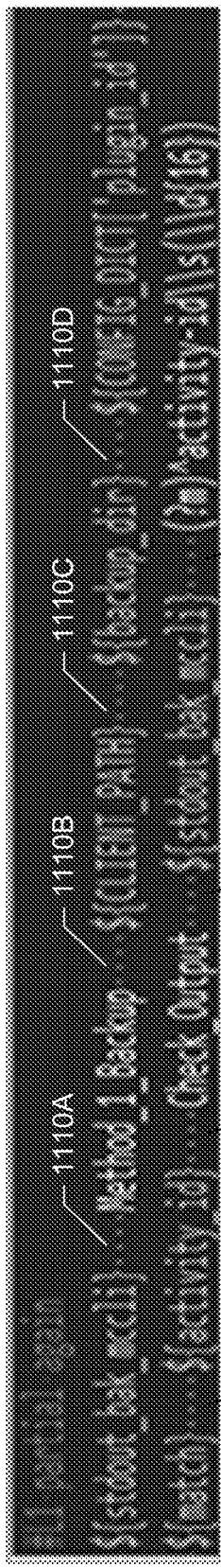
FIG. 11
FIG. 12
FIG. 13

```
code_snippet_keyword_list_set()
Loop:
Go through each code_snippet in code_snippet_set(..);
    Loop: each element in code_snippet(..);
        if each element in code_snippet in keywords_dictionary(..);
            add the element in code_snippet_keyword_list()
    add each code_snippet_keyword_list() in code_snippet_keyword_list_set(..)

Loop:
Go through each code_snippet_keyword_list in code_snippet_keyword_list_set();
    if any 2 each code_snippet_keyword_list are identical:
        cluster 2 code_snippet one kind of code_snippet output:
u:['Method_1_Restore','Check_Output']
v:['Method_1_Replicate','Check_Output']
w:['Method_1_Security','Check_Output']
x:['Method_1_Backup','Check_Output']
y:['Method_1_Restore','Check_Output']
z:['Method_1_Backup','Check_Output']

x,z are the one kind of keyword   backup
u,y are the one kind of keyword   restore
v     one kind of keyword         replication
w     one kind of keyword         security
```

FIG. 14

```
c2 = [("Backup_1"), ("Check_Output")]
c3 = [("Backup_1"), ("Check_Output")]
c4 = c2
c5 = [("Check_Output"), ("Backup_1")]
c6 = c2
c1 >> c2 >> True
c3 >> c4 >> True
c1 >> c5 >> False
```

FIG. 15

{step1-case1,step2-case3...} → $C_i$

...

{step3-case5,step5-case7...} → $C_j$

FIG. 16

1805 — T1 → "Create a full backup"
1815
1810 — T2 → "perform L1 backup without any changes"
1820
1825 — T is the vector as below:

```
>>> T
[[('create', 'full', 'backup'), ('perform', 'L1', 'backup', 'without', 'changes')]]
```
1830                                                                      1835

FIG. 18

1910
1925A — {T1, T4, T5 ...}  1925D — 1925E → Code snippet 1  1920A
1925B — {T2, T3, T7 ...}  1925C — 1925G → Code snippet 2  1920B
......
......
{T6, T9, T12 ...} → Code snippet p   1915

Where each T contains different words:

$$T = \{w1, w2 \cdots wk\}, k = 1,2,3 \cdots$$

For the code snippet category:

$$C = \{C1, C2 \cdots Cp\}, p = 1,2,3 \cdots$$

FIG. 19

$$P(C|Tx) = \frac{P(Tx|C)P(C)}{P(Tx)} = \frac{P(w1|C)P(w2|C)\cdots P(wx|C)P(C)}{P(w1)\cdots P(wx)}$$

FIG. 23

$$P(w|C) = \frac{\#(occurrences\ for\ w\ in\ C)}{\#(sum\ of\ the\ occurrences\ for\ all\ sample\ words\ in\ Category\ C)}$$

FIG. 24

$$argmax\ P(Ci|Tx) \begin{cases} P(C1|Tx) = \frac{P(w1|C1)\cdots P(wx|C1)P(C1)}{P(w1)P(w2)\cdots P(wx)} \\ \vdots \\ P(Cp|Tx) = \frac{P(w1|Cp)\cdots P(wx|Cp)P(Cp)}{P(w1)P(w2)\cdots P(wx)} \end{cases}$$

FIG. 25

$$P(Ci|Tx) \propto P(w1|Ci)\cdots P(wx|Ci)P(Ci);\ i = 1,2,3\ldots p$$

FIG. 26

$$P(w|C) = \frac{\#(occurrences\ for\ w\ in\ C) + 1}{\#(sum\ of\ the\ occurrences\ for\ all\ sample\ words\ in\ Category\ C) + \#(all\ unique\ words\ in\ all\ categories)}$$

GENERATING EXECUTABLE TEST AUTOMATION CODE AUTOMATICALLY ACCORDING TO A TEST CASE

CROSS REFERENCE TO RELATED APPLICATIONS

This application claims priority under the Paris Convention to Chinese Patent Application No. 201810765680.4, filed Jul. 12, 2018, in China and is incorporated herein by reference.

TECHNICAL FIELD

The present invention relates generally to information processing systems, and more particularly to automating software testing.

BACKGROUND

Testing software is a routine part of software development. Typically, when an application or other piece of software needs to be tested, a manual test case is created. In many cases, it is desirable to automate the testing process. Automation allows the test case to be run automatically against the application under test. This allows the test to be repeatedly run at many different times and at all hours of the day without a human tester having to manually execute the test steps.

In order to automate the test case, however, a quality assurance (QA) engineer must write the scripts in a given programming language for the manual test case. Writing code for test scripts can be a very time consuming and labor intensive process. Moreover, there can be errors in the test scripts themselves because we all make mistakes. For example, the QA engineer may make a mistake with the programming syntax or there may be logic errors in the code. As a result, the application may not be properly tested and may be released with bugs or other defects. For example, the application may not manage memory correctly leading to memory leak, which in turn can exhaust available system memory and reduce the performance of the computer.

There is a need for improved systems and techniques for creating automated test scripts.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 11 shows an example of a code snippet, according to one or more embodiments.

FIG. 12 shows an example of the code snippet having been chunked, according to one or more embodiments.

FIG. 13 shows an example of keywords identified from the chunked code snippet, according to one or more embodiments.

FIG. 14 shows an example of pseudo code for creating lists of code snippet keywords, according to one or more embodiments.

FIG. 15 shows an example of comparing code snippet keyword lists for clustering code snippets, according to one or more embodiments.

FIG. 16 shows an example of clustered code snippet categories and associated test steps from various test cases, according to one or more embodiments.

FIG. 18 shows an example of refining test steps, according to one or more embodiments.

FIG. 19 shows an example of a mathematical representation of a vector T for training word segments, according to one or more embodiments.

FIG. 23 shows an example of the Naïve Bayes formula, according to one or more embodiments.

FIG. 24 shows an example of calculations according to the Naïve Bayes formula, according to one or more embodiments.

FIG. 25 shows another example of calculations according to the Naïve Bayes formula, according to one or more embodiments.

FIG. 26 shows another example of calculations according to the Naïve Bayes formula, according to one or more embodiments.

FIG. 27 shows another example of calculations according to the Naïve Bayes formula, according to one or more embodiments.

DETAILED DESCRIPTION

Figure 1:
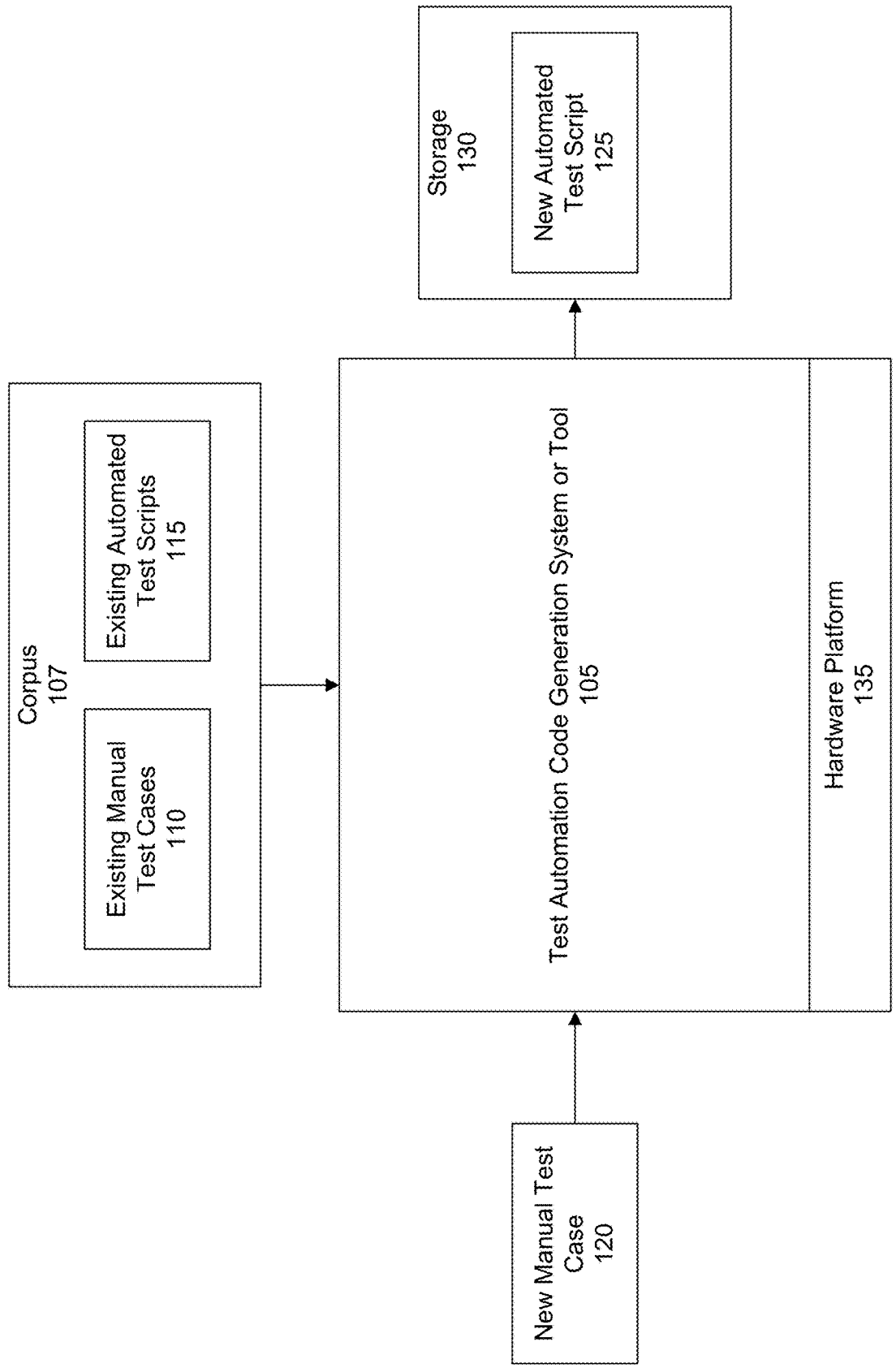
FIG. 1 shows a block diagram of an information processing system comprising a test automation code generation system or tool, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for generating executable test automation code or an automated test script automatically based on a manual test case. In a specific embodiment, there is a manual test case for which a corresponding automated test script does not yet exist. In this specific embodiment, the manual test case is provided as input to a test automation code generation system or tool. The tool processes the manual test case and outputs an automated test script corresponding to the manual test case. The automated test script is generated automatically (e.g., without user intervention) based on the manual test case. The automated test script can then be executed to test, for example, a computer program or other application. The tool can save a user, such as a quality assurance (QA) engineer, a great deal of time and effort because the test script is generated automatically.

For example, when a particular application program is to be tested, a manual test case may be created that lists a set of manual test steps that a human tester should follow and perform in order to test the particular application program. It can be desirable to create an automated test script that can be executed by a computer so that the test case can be performed automatically against the application under test. However, it can take a great deal of time and effort for a user (e.g., QA engineer or other programmer) to manually write or develop such an automated test script. Programmers require time to create and write code. Indeed, once the programmer has developed the automated test script, the automated script itself may have bugs because humans can make mistakes (e.g., typographical errors in the programming language syntax). The tool, however, can help to lower the likelihood of bugs in the automated test script itself because the automated test script is generated automatically by the tool. The tool provides system and techniques to automatically develop, create, or generate automated test scripts which can help to lower development cost, reduce development time, improve software quality, and improve the performance and operation of a computer when executing the application.

FIG. 1 shows simplified block diagram of a test automation code generation system or tool 105. The tool is trained using a pool or corpus 107 of existing manual test cases 110 and corresponding existing automated test scripts 115. After the tool has been trained, a new manual test case 120, for which an automated test script does not yet exist, is provided to the trained tool. In other words, a manual test case may include natural language and may not include computer code. Thus, the manual test case will not able to be compiled or executed because it will not have been written using a computer programming language and associated format or syntax. The trained tool receives the new manual test case, processes the new manual test case, and outputs a new automated test script 125 according to the new manual test case.

The new automated test script may then be stored in a test case storage repository 130, added to the corpus of automated test scripts, or both. For example, the test case repository may store other existing automated test scripts. When an application is to be tested, the newly created automated test script may be retrieved from the test case repository and executed against the application to be tested. Automated test scripts that are generated automatically by the tool and automated test scripts that are developed manually may be stored in the same or different storage locations. An automated test script generated automatically may include an attribute indicating that it was generated automatically. An automated test script that was developed manually may include a different attribute indicating that it was developed manually. This can help to facilitate troubleshooting as it allows the user to distinguish between automated test scripts that were generated automatically versus automated test scripts that were developed manually.

As shown in the example of FIG. 1, the tool may be in communication with a hardware platform 135. The hardware platform may include computer components such as a hardware processor, mass storage device, network interface, memory, and so forth. The components may be interconnected with each other such as via a bus or other connection scheme. The memory may store program instructions of the tool which may be executed by the processor to generate the new automated test scripts. It should be appreciated that variables such as k and other similar index variables herein such as p are assumed to be arbitrary positive integers greater than or equal to two.

Figure 2:
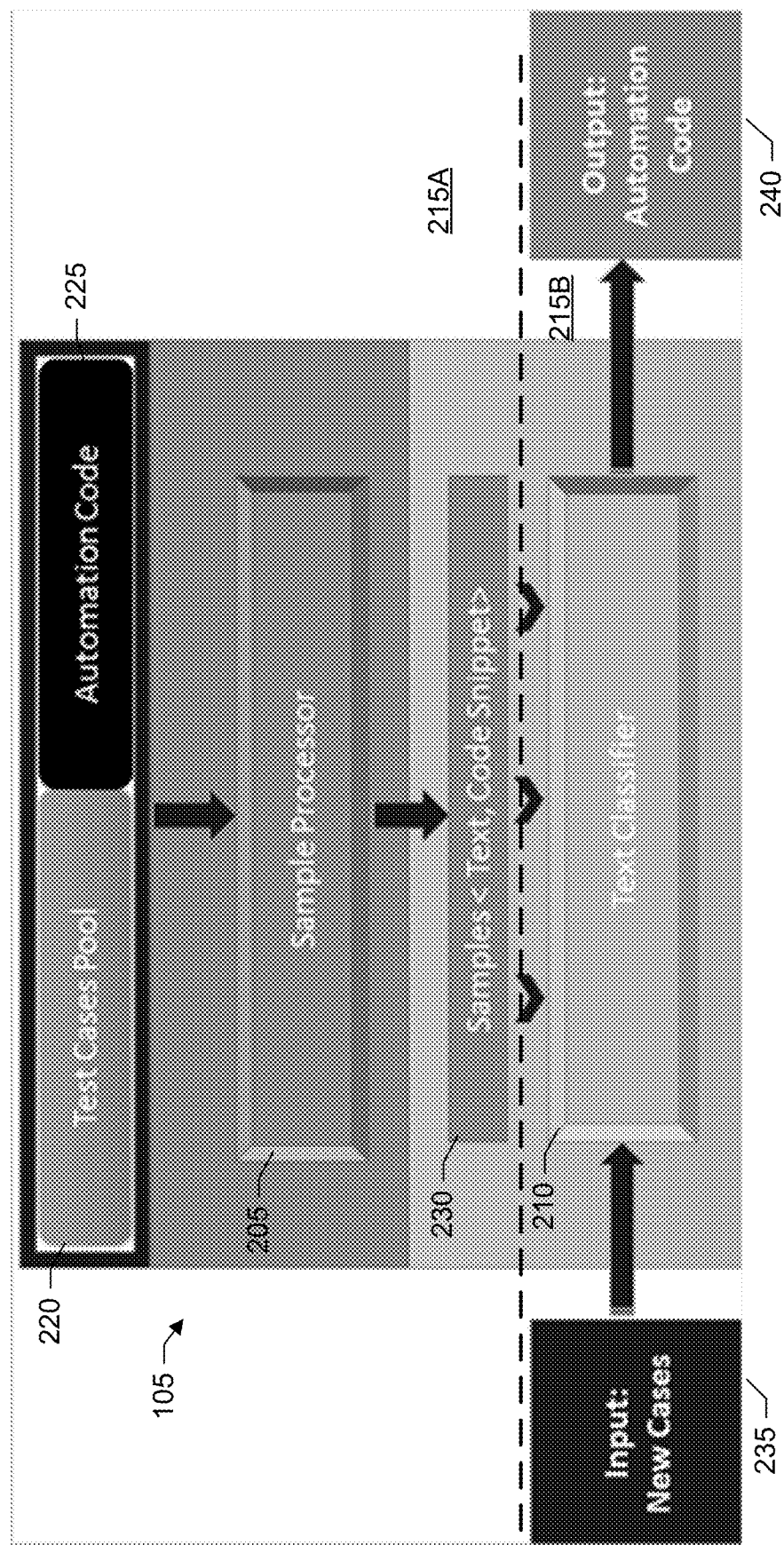
FIG. 2 shows a block diagram of the system shown in FIG. 1 in further detail, according to one or more embodiments.

FIG. 2 shows an architecture diagram of tool 105 in further detail. In a specific embodiment, the tool includes a set of components including a sample processor 205 and a text classifier 210. There is a pre-processing phase 215A and an automated test script generation phase 215B. The pre-processing phase includes raw data collection and corpus refinement. The test script generation phase occurs after the pre-processing phase. During the script generation phase, a new manual test case 235 is provided to the text classifier which then generates a new automated test script (e.g., automation code) 240 according to the new manual test case.

Specifically, the sample processor is responsible for raw data collection (including existing manual test cases and corresponding automated test scripts) and refining the corpus of collected data. For example, as shown in FIG. 2, the sample processor receives as input existing manual test cases 220 and existing automated test code or scripts 225 (e.g., automation code) corresponding to the existing manual test cases. That is, input are test cases in text format (e.g., natural language) and automation code. Natural language generally refers to language that has evolved naturally in humans through use and repetition without conscious planning or premeditation.

More particularly, the test cases may include a set of test steps that are in a natural language format or written using a natural language (e.g., English). The test steps may include natural language sentences. Table A below shows an example of a manual test case.

TABLE A

| Step Number | Action |
| --- | --- |
| step 1 | open a browser |
| step 2 | go to www.dell.com |
| step 3 | click on the 'log in' button in the upper right corner |

TABLE A-continued

| Step Number | Action |
| --- | --- |
| step 4 | enter 'madeleine@violetcompany.com' as the email address and 'greatwall' as the password |
| step 5 | check the box that indicates you accept the terms of the license |
| step 6 | click the 'log in' button |

A first column of the table is labeled "Step Number." A second column of the table is labeled "Action." The steps are numbered consecutively in the order in which the actions or procedures corresponding to the steps should be performed.

The automation code may be in a computer programming language. Computer programming language is a formal language that specifies a set of instructions that can be used to produce or cause various kinds of output when processed by a computer. Programming languages generally include instructions for a computer. Programming languages can be used to create programs that implement specific algorithms. An example of a programming language is the C programming language.

The output of the sample processor includes a set of samples 230. In an embodiment, the samples are in the format of <T,C>, where T is a vector of text, and C is a corresponding code snippet. Vector T may be referred to as a training word segment.

The text classifier is a core component of the tool. The text classifier is responsible for generating automation code (e.g., automated test scripts) upon the input of new manual test cases. In a specific embodiment, the text classifier is trained by the Naïve Bayes algorithm with the input of samples which are generated by sample processor. The Naïve Bayes algorithm is a classification technique based on Bayes' Theorem with an assumption of independence among pieces of evidence. Bayesian theory describes the probability of an event, based on prior knowledge of conditions or evidence that might be related to the event. It can be used to help determine a degree of confidence or certainty to have regarding several possible conclusions.

Generally, a Naïve Bayes classifier assumes that the presence of a particular piece of evidence is unrelated to the presence of any other piece of evidence. For example, a fruit may be considered to be an apple if it is red, round, and about 3 inches in diameter. Even if these features depend on each other or upon the existence of the other features, all of these properties independently contribute to the probability that this fruit is an apple. The simplifying assumption that the pieces of evidence are not interrelated in a particular way is why the algorithm is referred to as naïve.

In a specific embodiment, the text classifier uses the Naïve Bayes algorithm to derive or calculate the probability of a prediction based on a set of underlying evidence. In this specific embodiment, the text classifier relies on Bayesian theory to build a model from training data provided by the sample processor. The model can then be applied or used to examine a new manual test case and, based on a scoring process of the text classifier, make predictions (i.e., scores) regarding what an automated test script corresponding to the new manual test case should be. Applying the Naïve Bayes algorithm may include obtaining a set of training data, converting the training data into a frequency table, creating a likelihood table, and using the Naïve Bayes formula to calculate probabilities. A further discussion of the Naïve Bayes algorithm may be found in *Machine Learning*, by Tom M. Mitchell, McGraw-Hill Science/Engineering/Math, Mar. 1, 1997, which is incorporated by reference along with all other references cited. It should be appreciated that other classification algorithms besides the Naïve Bayes algorithm may instead or additionally be used to build the model such as, for example, a decision tree, hybrid decision tree, support vector machine (SVM) classifier, and so forth.

Figure 3:
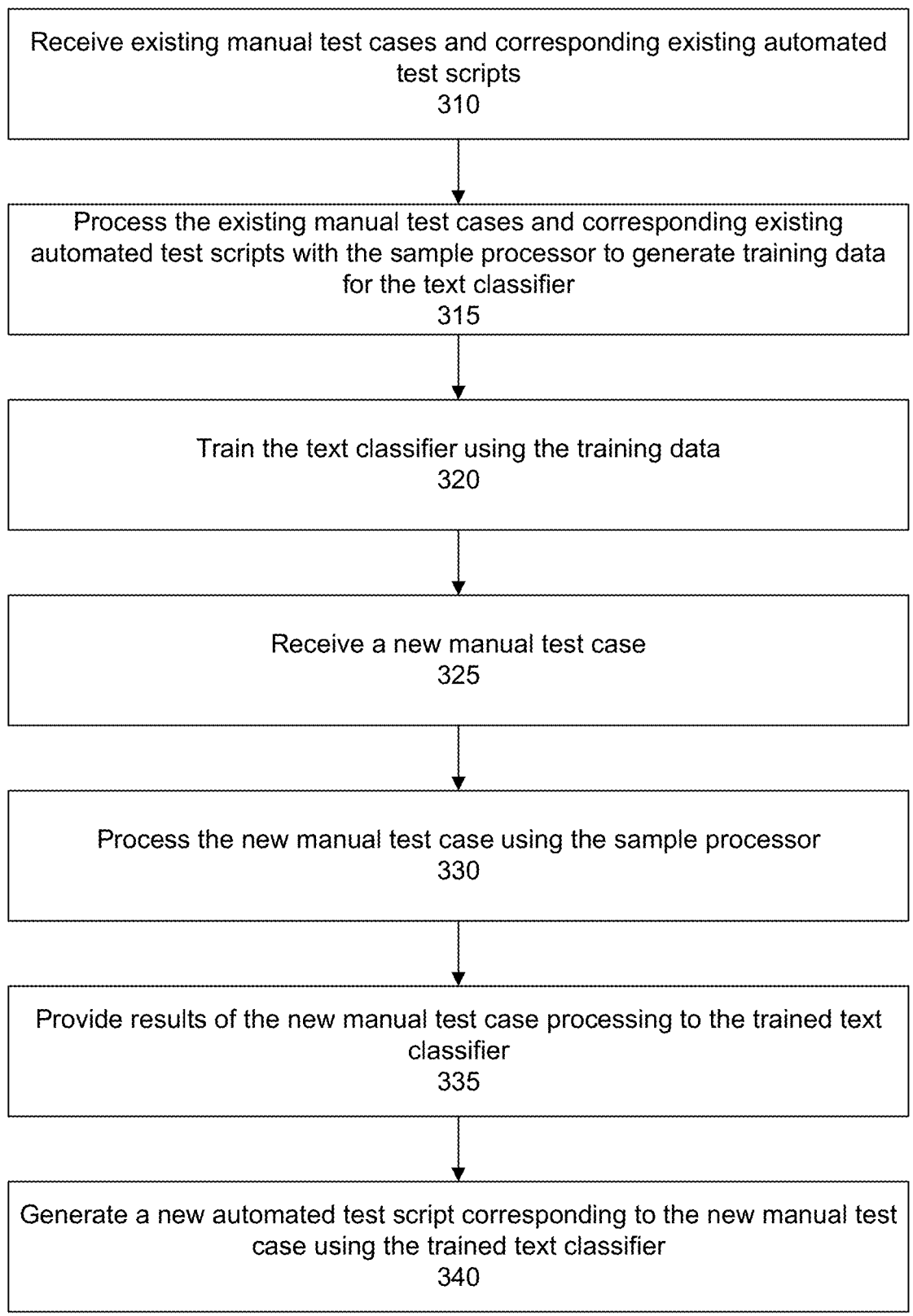
FIG. 3 shows an overall flow of the system, according to one or more embodiments.

FIG. 3 shows an overall flow of the tool. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 310, existing manual test cases and corresponding existing automated test scripts are received or obtained. In a step 315, the existing manual test cases and corresponding existing automated test scripts are processed with the sample processor to generate training data for the text classifier. In a step 320, the text classifier is trained using the training data. The training may include analyzing the training data and building a model from the training data.

Steps 310-320 may be part of the pre-processing phase. In a specific embodiment, the sample processor collects raw data from an existing manual test case pool and related automation scripts and uses natural language processes to refine the corpus of collected data. The pre-processing may include collecting raw data from an existing test case and automation script pool. The pre-processing may include mapping each existing manual test case to a corresponding automation case (e.g., automated test script) via a case identifier. In a specific embodiment, the natural language process is implemented with the Python Natural Language Toolkit (NLTK) library and includes stopping words deletion.

In a step 325, a new manual test case is received or obtained for which an automated test script does not yet exist. In other words, at the time the new manual test case is received, there will not yet be an automated test script for the new manual test case. In a step 330, the new manual test case is processed using the sample processor. In a step 335, results of the new manual test case processing is provided to the trained text classifier. In a step 340, a new automated test script corresponding to the new manual test case is generated or created using the trained text classifier. Generating the new automated test script may include applying the model that was previously built using the training data. Steps 325-340 may be part of the new script generation phase.

Figure 4:
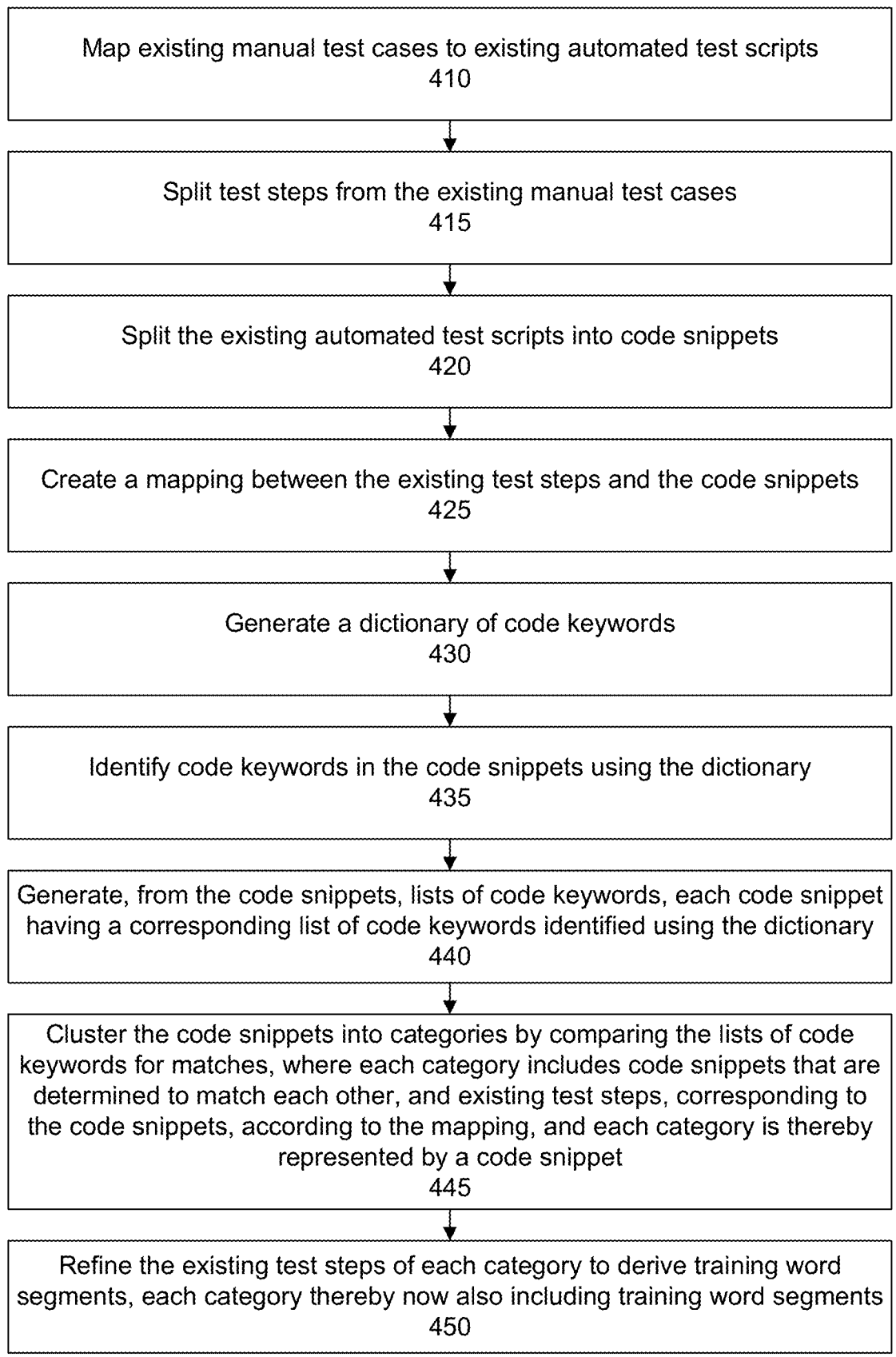
FIG. 4 shows an overall flow for pre-processing, according to one or more embodiments.

FIG. 4 shows further detail of a flow for the pre-processing phase. In a step 410, existing manual test cases are mapped to their corresponding existing automated test scripts. In a specific embodiment, there is a manual test case management pool. Each manual test case includes a unique case identifier (ID). Each manual test case from the pool may have a corresponding automated test script specified using the format "case id:case name" when the automated test scripts were developed for these manual test cases. Thus, the existing manual test case may be mapped to its corresponding or related existing automation code via the case ID.

Figures 5, 6, 7:
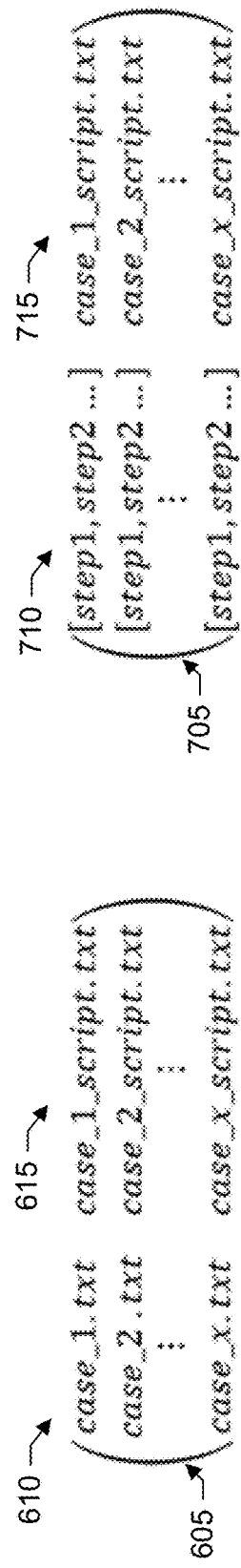
FIG. 5 shows an example of pseudo code for mapping existing test cases and automated test scripts, according to one or more embodiments.
FIG. 6 shows an example of a matrix mapping test cases to automated test scripts, according to one or more embodiments.
FIG. 7 shows an example of a matrix in which test steps have been split from the test cases, according to one or more embodiments.

FIG. 5 shows an example of pseudo code for the mapping. The mapping includes pairing an existing manual test case to its corresponding existing automated test script. A matrix may be created to store the pairing.

FIG. 6 shows an example of a matrix 605 that may be created after the operations shown in the pseudo code of FIG. 5 have completed. The matrix includes first and second columns 610 and 615, respectively. The first column lists existing manual test cases. The second column lists existing automated test scripts corresponding to the existing manual test cases. For example, as shown in the example of FIG. 6, a first manual test case named "case_1.txt" has a corresponding first automated test script named "case_1_script.txt." A second manual test case named "case_2.txt," different from the first manual test case, has a corresponding second automated test script named "case_2_script.txt," different from the first automated test script. And so forth.

Referring back now to FIG. 4, in a step 415, existing manual test steps from the existing manual test cases are split or extracted. The sample processor may split each manual test case into a steps list. More specifically, a manual test case may include a listing of test steps numbered consecutively and a corresponding listing of actions. The sample processor may scan the manual test case for the steps and extract each step as a discrete unit. FIG. 7 shows an example of a matrix 705 storing the extracted steps. The matrix shown in FIG. 7 is similar to the matrix shown in FIG. 6.

In the matrix of FIG. 7, however, the steps for each manual test case have been extracted or split into a steps list. Specifically, the matrix includes first and second columns 710 and 715, respectively. The first column includes listings of steps for existing manual test cases. The second column lists existing automated test scripts corresponding to the listings of steps. For example, a first row of the matrix includes a first list of steps, e.g., "[step 1, step 2 . . . ]," which are steps from a first existing manual test case; and a first existing automated test script, e.g., "case_1_script.txt," corresponding to the first list of steps which, in turn, lists the manual test steps from the first existing manual test case.

A second row includes a second list of steps, e.g., "[step 1, step 2 . . . ]," which are steps from a second existing manual test case; and a second existing automated test script, e.g., "case_2_script.txt," corresponding to the second list of steps which, in turn, lists the manual test steps from the second existing manual test case. And so forth. In a specific embodiment, steps for a manual test case (e.g., "case_1.txt") are stored using one line for one step. This helps to facilitate splitting the case into individual or separate steps and maintain the order of each step. For example, there can be a text file for a manual test case. A first line in the text file may include a first step for the manual test case. A second line in the text file, after the first line, may include a second step for the manual test case. A third line in the text file, after the first and second lines, many include a third step for the manual test case. And so forth.

Referring back now to FIG. 4, in a step 420, the existing automated test scripts corresponding to the existing manual test cases are split into code snippets. In a step 425, a mapping is created between the existing manual test steps and the code snippets.

In a specific embodiment, delimiters are placed within an automated test script to specify the boundary between code for separate test steps. A delimiter is a sequence of one or more characters used to specify the boundary between separate, independent regions in plain text or other data streams. An example of a delimiter is a hash or pound sign (e.g., "#"). Other examples of delimiters include parentheses, braces, angle brackets, asterisks, and so forth.

In a specific embodiment, a pound sign (e.g., "#") is used in an automated test script as a delimiter. In this specific embodiment, the tool scans an automated test script for delimiters to split an automated test script into a set of code snippets. The set of code snippets are mapped to the list of test steps from a manual test case. The tool may perform a mapping of one natural language test case step by step to a respective code snippet. In a specific embodiment, each test step maps a pound sign (e.g., "#") in the automation code. This helps to ensure a one-to-one mapping between manual test case steps and automation code snippets.

Figure 8:
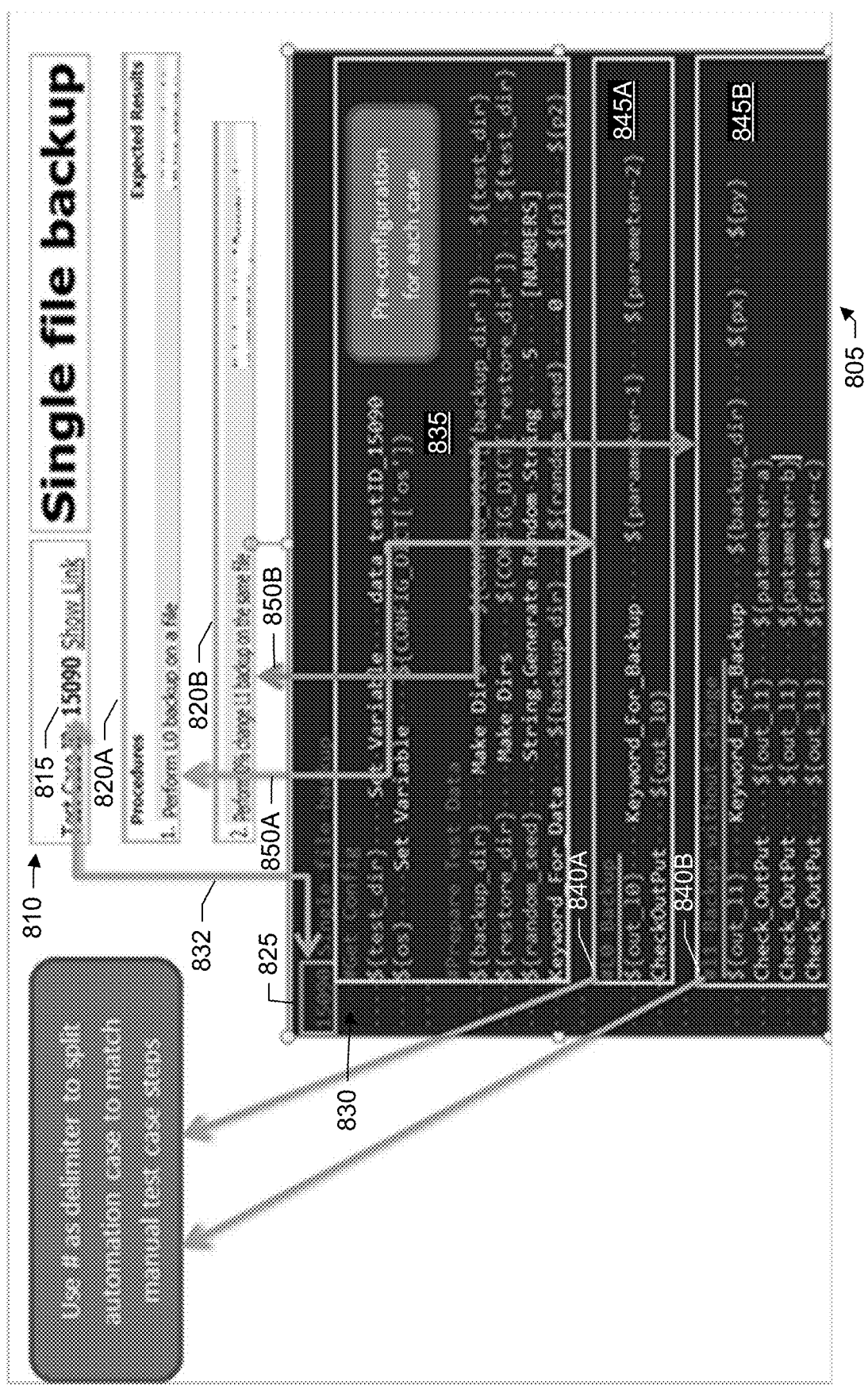
FIG. 8 shows an example of an automated test script and the mapping operations, according to one or more embodiments.

FIG. 8 shows an example of an automated test script 805 and the mapping operations. In this example, the automated test script corresponds to a manual test case 810 for a single file backup. The manual test case includes a test case ID 815 and a listing of test steps or procedures such as a first step 820A, a second step 820B, and so forth. The test steps are written in a natural language format.

The automated test script includes a same test case ID 825, and a set of delimiters 830. The test case IDs allow for a mapping 832 between the manual test case and the automated test script. There can be a set of initial delimiters. In this example, there are a set of initial delimiters corresponding to a pre-configuration 835 for each case. During the mapping, the initial delimiters may or may not be skipped. In this example, the "#" delimiter is used to split an automation case to match to the manual test case steps. More particularly, as shown in the example of FIG. 8, a delimiter 840A defines a boundary of a first code snippet 845A. The first code snippet is mapped 850A to the first test step. A delimiter 840B defines a boundary of a second code snippet 845B. The second code snippet is mapped 850B to the second test step.

In a specific embodiment, a method includes: receiving a manual test case comprising a list of test steps; receiving an automated test script corresponding to the manual test case, the automated test script comprising automation code and delimiters; identifying a test step; scanning the automated test script for a delimiter; mapping the test step to automation code between the delimiter and a next or subsequent delimiter; and repeating the identifying, scanning, and mapping for each other remaining test step and respective delimiter.

Figure 9A:
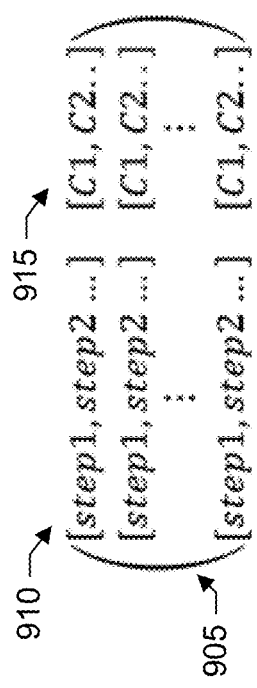
FIG. 9A shows an example of a matrix of a list of test steps mapped to a list of code snippets, according to one or more embodiments.

FIG. 9A shows an example of a matrix 905 that may be created to store the mapping between test steps and code snippets. The matrix shown in FIG. 9 is similar to the matrix shown in FIG. 7.

In the matrix of FIG. 9A, however, the automated test scripts have been split into code snippets. Specifically, the matrix includes first and second columns 910 and 915. The first column includes listings of steps from existing manual test cases. The second column includes listings of code snippets from corresponding existing automated test scripts.

Specifically, as shown in the example of FIG. 9A, a first row of the matrix includes a first list of steps, e.g., "[step 1, step 2 . . . ]" and a first list of code snippets, e.g., "[C1, C2 . . . ]." The first list of steps are from a first manual test case. The first list of code snippets are from a first automated test script corresponding to the first manual test case. The first list of code snippets correspond to or are mapped to the first list of steps. The order or location of an element in a particular list serves to indicate the corresponding element that the element is mapped to. For example, in the first row of the matrix, "step1" (e.g., manual test step 1) is in a first position in the steps list. "C1" (e.g., code snippet 1) is also in a first position in the corresponding code snippet list. Thus, "step1" is mapped to "C1." "Step2" (e.g., manual test step 2) is in a second position in the steps list. "C2" (e.g., code snippet 2) is also in a second position in the corresponding code snippet list. Thus, "step2" is mapped to "C2."

Similarly, a second row of the matrix includes a second list of steps and a second list of code snippets. The second list of steps are from a second manual test case. The second list of code snippets are from a second automated test script corresponding to the second manual test case. The second list of code snippets correspond to or are mapped to the second list of steps. And so forth.

Figure 9B:
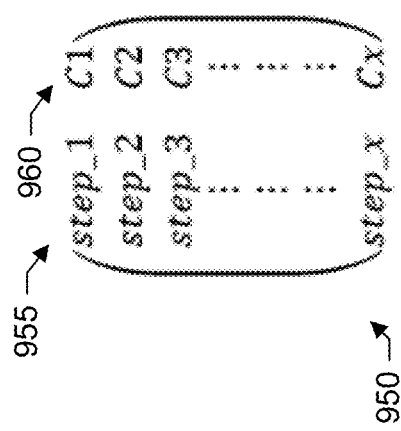
FIG. 9B shows an example of a matrix in which the list of test steps mapped to the list of code snippets has been expanded, according to one or more embodiments.

In a specific embodiment, the matrix shown in FIG. 9A is further processed to map an individual test step to an individual code snippet into a format specified as "[sample, Label]." This processing may include unpacking or expanding the step lists and code snippet list, where a test "step" and code snippet "C" can be from any manual test case and automation case, respectively. FIG. 9B shows an example of a matrix 950. The matrix shown in FIG. 9A is similar to the matrix shown in FIG. 9B. In the matrix of FIG. 9B, however, the test step lists and code snippet lists have been expanded to map a particular test step to a particular code snippet.

Specifically, the matrix includes first and second columns 955 and 960. The first column lists test steps. The second column lists code snippets corresponding to the test steps. For example, a first row of the matrix includes a first step, e.g., "step_1," and a first code snippet, e.g., "C1," mapped to the first step. The second row of the matrix includes a second step, e.g., "step_2," and a second code snippet, e.g., "C2," mapped to the second step. The third row of the matrix includes a third step, e.g., "step_3," and a third code snippet, e.g., "C3," mapped to the third step. And so forth.

Thus, as shown in the example of FIG. 9B, at this stage in the process there is a mapping between all natural languages steps and their related code snippets. In this specific embodiment, a single step maps to a single code snippet.

Referring back now to FIG. 4, in a step 430, a dictionary of code keywords is generated. In other words, the dictionary may include words used for computer code. A code keyword may include a single word, a sequence of words, or multiple words (e.g., two or more words). These code keywords may be collected from any number of test libraries.

In a specific embodiment, code keywords are collected from the libraries available from Robot Framework as provided by the Robot Framework Foundation, libraries external to the Robot Framework that are developed according the Robot Framework syntax, other libraries, or combinations of these. Robot Framework is a generic test automation framework for acceptance testing and acceptance test-driven development (ATDD). A further discussion of Robot Framework is provided in the Robot Framework User Guide, version 3.0.4, 2016, which is incorporated by reference herein along with all other references cited.

Test libraries provide the actual testing capabilities to Robot Framework by providing keywords. There are several standard libraries that are bundled in with the framework, and many other separately developed external libraries that are available.

Table B below shows a listing of the standard libraries available in the Robot Framework.

TABLE B

| Library | Description |
| --- | --- |
| Builtin | Provides a set of often needed generic keywords. Always automatically available without imports. |

TABLE B-continued

| Library | Description |
|---|---|
| Dialogs | Provides means for pausing the test execution and getting input from users. |
| Collections | Provides a set of keywords for handling Python lists and dictionaries. |
| OperatingSystem | Enables various operating system related tasks to be performed in the system where Robot Framework is running. |
| Remote | Special library acting as a proxy between Robot Framework and test libraries elsewhere. Actual test libraries can be running on different machines and be implemented using any programming language supporting XML-RPC protocol. |
| Screenshot | Provides keywords to capture screenshots of the desktop. |
| String | Library for generating, modifying and verifying strings. |
| Telnet | Makes it possible to connect to Telnet servers and execute commands on the opened connections. |
| XML | Library for generating, modifying and verifying XML files. |
| Process | Library for running processes in the system. |
| DateTime | Library for date and time conversions. |

Each library includes a set of keywords. For example, table C below shows a sampling of keywords from the Builtin library.

TABLE C

| Keyword | Arguments | Documentation |
|---|---|---|
| Call Method | object, method_name, *args, **kwargs | Calls the named method of the given object with the provided arguments. The possible return value from the method is returned and can be assigned to a variable. Keyword fails both if the object does not have a method with the given name or if executing the method raises an exception. |
| Catenate | *items | Catenates the given items together and returns the resulted string. |
| Comment | *messages | Displays the given messages in the log file as keyword arguments. |
| Continue For Loop | | Skips the current for loop iteration and continues from the next. Skips the remaining keywords in the current for loop iteration and continues from the next one. Can be used directly in a for loop or in a keyword that the loop uses. |
| Continue For Loop If | condition | Skips the current for loop iteration if the condition is true. |
| Convert To Binary | item, base=None, prefix=None, length=None | Converts the given item to a binary string. |
| Convert To Boolean | item | Converts the given item to Boolean true or false. |
| Convert To Bytes | input, input_type=text | Converts the given input to bytes according to the input_type. |
| Convert To Hex | item, base=None, prefix=None, length=None, lowercase=False | Converts the given item to a hexadecimal string. |
| Convert To Integer | item, base=None | Converts the given item to an integer number. |
| . . . | . . . | . . . |

Table D below shows a listing of the some of the external libraries available in the Robot Framework.

TABLE D

| Library | Description |
|---|---|
| Android library | Library for all your Android automation needs. It uses Calabash Android internally. |
| AnywhereLibrary | Library for testing Single-Page Apps (SPA). Uses Selenium Webdriver and Appium internally. |
| AppiumLibrary | Library for Android- and iOS-testing. It uses Appium internally. |
| Archive library | Library for handling zip- and tar-archives. |
| AutoItLibrary | Windows GUI testing library that uses AutoIt freeware tool as a driver. |
| CncLibrary | Library for driving a CNC milling machine. |
| Database Library (Java) | Java-based library for database testing. Usable with Jython. Available also at Maven central. |
| Database Library (Python) | Python based library for database testing. Works with any Python interpreter, including Jython. |
| Diff Library | Library to diff two files together. |
| Django Library | Library for Django, a Python web framework. |
| Eclipse Library | Library for testing Eclipse RCP applications using SWT widgets. |
| robotframework-faker | Library for Faker, a fake test data generator. |
| . . . | . . . |

Table E below shows a sampling of keywords from the Android library.

TABLE E

| Keyword | Arguments | Documentation |
|---|---|---|
| Capture Screenshot | filename=None | Captures a screenshot of the current screen and embeds it in the test report |
| Connect To Testserver | | Connect to the previously started test server inside the Android Application. Performs a handshake. |
| Install Application | apk_file | Installs the given Android application package file (APK) on the emulator along with the test server. |
| Press Menu Button | | Press the menu button ("KEYCODE_MENU"), same as '| Send Key | 82 |' |
| Screen Should Contain | text | Asserts that the current screen contains a given text |
| Screen Should Not Contain | text | Asserts that the current screen does not contain a given text |
| . . . | . . . | . . . |

Figure 10:
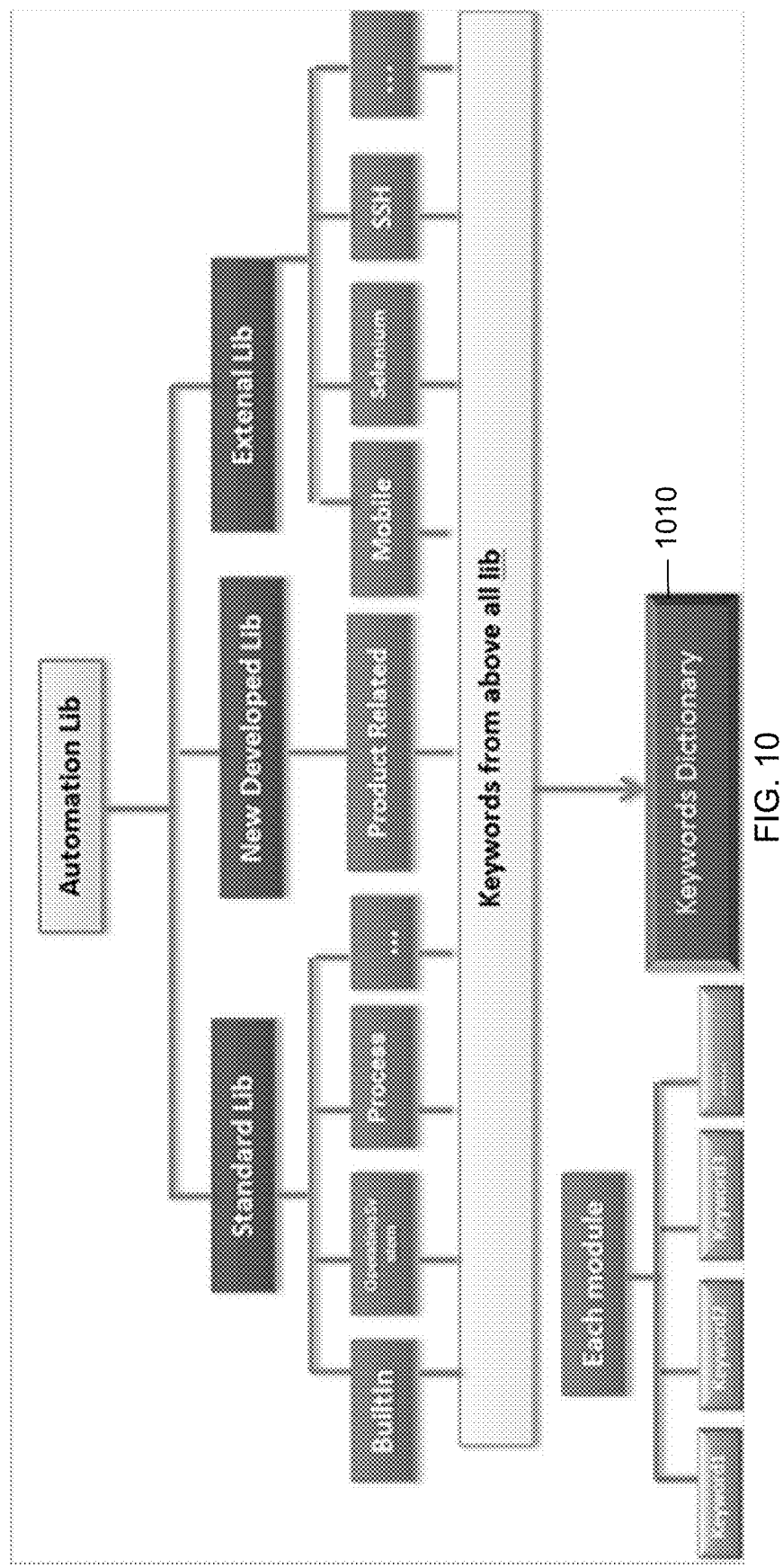
FIG. 10 shows an example of a hierarchy of automation libraries, according to one or more embodiments.

In a specific embodiment, generating the dictionary includes collecting all code keywords in one or more automation libraries. Keywords in the Robot framework may be treated as functions for any programming language. FIG. 10 shows an example of a hierarchy for the automation libraries and keywords collection into a keywords dictionary 1010.

As shown in the sample code keyword tables above, a keyword may include one or more words tied together. The tool crawls a website to collect the code keywords. In the Robot Framework, for example, the full name of one keyword may be in the format case-, space- and underscore-insensitive. In a specific embodiment, an underscore is used to tie all words together as one keyword. This allows for fetching the whole keyword name rather than a single word. Thus, the tool does not need determine whether a single word is keyword's element, but can directly fetch the keywords name. Upon fetching the keyword, the keyword is stored in the keywords dictionary. Table F below shows a format or pseudo code for storing the keywords.

TABLE F

```
{
BuildIn:['Call Method','Catenate'...],
Collections:['Append To List','Combine Lists'...]
Common:['rekickstart and web install','upgrade avamar'...]
......
}
```

Referring back now to FIG. 4, in a step 435 code keywords in the code snippets are identified using the dictionary. In a step 440, the tool generates, from the code snippets, lists of code keywords, each code snippet having a corresponding list of code keywords identified using the dictionary. In a specific embodiment, the logic shown in the pseudo code of table F above is used to determine which code snippet contains which keywords.

In a specific embodiment, a method includes storing a dictionary comprising a plurality of code keywords; selecting a code snippet comprising a plurality of code pieces; comparing the plurality of code pieces in the code snippet to the plurality of code keywords in the dictionary to identify which code pieces match a code keyword in the dictionary; and creating a list of code keywords from the code snippet, the list of code keywords comprising code pieces from the code snippet that match code keywords in the dictionary.

In a step 445, the code snippets are clustered into categories by comparing the lists of code keywords to each other for matches, where each category includes code snippets that are determined to match each other, and existing manual test steps corresponding to the mapping (see, e.g., step 425), and each category is thereby represented by a code snippet.

More particularly, building the keywords dictionary allows for extracting or identifying keywords (e.g., code keywords) in the code snippet. In a specific embodiment, clustering the plurality of code snippets includes extracting keywords and parameters from each code snippet, filtering the parameters by comparing with a keyword dictionary, and comparing the code snippets to each other to determine which code snippet uses the same keywords as another code snippet, and based on the determination, treat those code snippets using the same keywords as being of the same kind or type of code snippet (e.g., categorizing those code snippets into the same category).

In a specific embodiment, a first operation to cluster a plurality of code snippets includes splitting a single code snippet string via a separator. In a specific embodiment, a string separator includes four blank characters (e.g., " . . . ."). For example, the Robot Framework uses four blank characters to divide all keywords and parameters. Consider, as an example, the code snippet shown in FIG. 11, where the symbol or period (e.g., ".") represents one blank character. The example shown in FIG. 11 includes separators 1110A-H.

FIG. 12 shows an example of a portion of the original code snippet shown in FIG. 11 having been split into several chunks 1210A-C by scanning for the separators. The chunks shown in FIG. 12 include keywords and parameters.

In an embodiment, the tool filters the parameters by comparing the chunks with the keywords dictionary. Once the keywords have been identified, the tool extracts only the keywords for a particular code snippet. In other words, in order to determine or distinguish a chunk as being a parameter or a keyword, the tool compares a chunk to the keywords dictionary. If the chunk matches a keyword in the keywords dictionary, a determination is made that the chunk is a keyword. If the chunk does not match a keyword in the keywords dictionary, a determination is made that the chunk is not a keyword. A determination may be made that the non-matching chunk is a parameter.

FIG. 13 shows an example of a portion of the original code snippet shown in FIG. 11 after the chunk splitting and filtering operations in which keywords 1310A-B have been identified based on a match being found in the keywords dictionary.

In an embodiment, the parameters are filtered as almost all parameters for keywords are fixed. In a specific embodiment, the parameters' value are placed in a configuration file with a JavaScript Object Notation (JSON) format. This allows for separating test logic and test data. It also helps to facilitate and simplify the process for clustering the code snippets.

In an embodiment, the various code snippets are preprocessed according to the examples shown in FIG. 11-13 and then placed into a code snippet set (e.g., code snippet set{ . . . }). The code snippet set may be referred to as a code snippet keyword list.

FIG. 14 shows an example of pseudo code for creating lists of code snippet keywords. In a specific embodiment, lists of code keywords are derived from the various code snippets by comparing the chunks in a code snippet to the code keyword dictionary for matches. A result of the processing may then include a plurality of code keyword lists, where each code keyword list corresponds to a respective code snippet, and includes chunks that match code keywords found in the code keyword dictionary, the matching chunks thereby being code keywords. Chunks that do not match code keywords from the code keyword dictionary may be excluded, omitted, or not included in the code snippet keyword lists. Although a code keyword list may include code, it may not be executable because other code elements such as parameters and syntax required to execute the code may be omitted or absent as part of the code keyword identification and filtering process. For example, an attempt to compile or execute a code keyword list may return an error. In an embodiment, the code keyword list, such as shown in FIG. 14, is only used to identify whether two code snippets are identical or to determine whether the code snippets are matching, the same, or of the same kind. The final output (e.g., automation script) is assembled using code snippets rather than code keywords.

In a specific embodiment, a method includes storing a dictionary comprising a plurality of code keywords; obtaining a plurality of code snippets, each code snippet comprising a plurality of chunks, each chunk being separated by a separator; selecting a first code snippet; comparing each chunk in the first code snippet to the dictionary; if the chunk in the first code snippet matches a code keyword in the dictionary, determining that the chunk in the first code snippet is a code keyword and adding the chunk in the first code snippet to a first code snippet keyword list; if the chunk in the first code snippet does not match a code keyword in the dictionary, determining that the chunk in the first code snippet is not a code keyword and not adding the chunk in the first code snippet to the first code snippet keyword list; selecting a second code snippet; comparing each chunk in the second code snippet to the dictionary; if the chunk in the second code snippet matches a code keyword in the dictionary, determining that the chunk in the second code snippet is a code keyword and adding the chunk in the second code snippet to a second code snippet keyword list; and if the chunk in the second code snippet does not match a code keyword in the dictionary, determining that the chunk in the second code snippet is not a code keyword and not adding the chunk in the second code snippet to the second code snippet keyword list.

In an embodiment, once the various code keyword lists have been generated, the code keyword lists are compared to each other in order to cluster the code snippets into categories. The tool goes through or examines all code snippet keywords lists to cluster related code snippets together. In other words, once the extracted keywords lists have been obtained for all the code snippets, a next step is to cluster them.

More particularly, in a specific embodiment, the keywords dictionary is used to extract all keywords for each code snippet. After the keywords for each code snippet have been extracted, a next step is to cluster code snippets which use the same keywords with the same order as one kind of code snippet. Code snippets determined to be of the same kind may be placed in the same category. To perform the clustering, in a specific embodiment, for the clustering operation, keywords in each code snippet are stored in a list (the index of each element indicates the order for keywords in each code snippet). The tool then compares whether the list is equivalent. The tool identifies whether or not two compared code snippets are the same kind of code snippets and thus should be belong to the same category. A code snippet that uses the same keywords with the same order may be treated as a single code snippet, same kind of code snippet, or placed into the same category.

FIG. 15 shows an example of comparing code snippets to each other. As shown in the example of FIG. 15, c1 and c2 is belong to one kind of code snippet. But c3 does not belong to the same kind of code snippet as c1 and c2 because the order for c3 is not same as compared with c1 or c2 even if they have same keywords. For example, c1 includes keywords "Backup_1," and "Check_Output," where "Backup_1" is in a first position, and "Check_Output" is in a second position. C2 includes keywords "Backup_1," and "Check_Output," where "Backup_1" is in a first position, and "Check_Output" is in a second position. Thus, c1 and c2 are determined to be the same because the keywords and ordering of the keywords match.

C3 also includes the same matching keywords "Backup_1" and "Check_Output." However, c3 is determined to not match with c1 (and c2) because the order in which the keywords appear are different from the order in which the keywords appear for c1 (and c2). Specifically, for c3, the keyword "Check_Output" is in the first position; whereas for c1 (and c2) the keyword "Check_Output" was in the second position. Similarly, for c3, the keyword "Backup_1" is in the second position; whereas for c1 (and c2), the keyword "Backup_1" was in the first position.

In a specific embodiment, a method includes obtaining a plurality of code snippets, and a plurality of keyword lists, each keyword list corresponding to a code snippet, and comprising words from the code snippet that have been determined to be keywords; comparing a first keyword list to a second keyword list; determining from the comparing whether first and second conditions are satisfied, wherein the first condition is satisfied when keywords in the first keyword list match keywords in the second keyword list, and the second condition is satisfied when each matching keyword in one of the first or second keyword list appears in the same order as each corresponding matching keyword in another of the first or second keyword list; if both the first and second conditions are satisfied, determining that a first code snippet corresponding to the first keyword list and a second code snippet corresponding to the second keyword list are the same, and clustering the first and second code snippets into a same category; and if both the first and second conditions are not satisfied, determining that the first and second code snippets are different, not clustering the first and second code snippets into the same category, and clustering the first and second code snippets into different categories, the first code snippet thereby being clustered into a first category, and the second code snippet thereby being clustered into a second category, different from the first category.

The comparing of keyword lists provides a technique to cluster or categorize the code snippets. In an embodiment, the categories are not predefined and are instead created as a result of the clustering operation. Table G below shows some examples of categories that may be created as a result of the clustering operation.

TABLE G

For one kind of code snippet for backup:
=============clip===============
${Output} Method_1_Backup ${backupdir} ${index}
Check_Output ${Output}
=============================

For one kind of code snippet for feature restore:
=============clip=================
${Output} Method_1_restore ${backupNum} ${index}
Check_Output ${Output}
=================================

For one kind of code snippet for feature replication:
=============clip=================
${Output} Replicate ${source} ${target}
Check_Output ${Output}
=================================

In an embodiment, a result of the clustering operation is a set of <Steps, C>. Where C is a code snippet which is the category. For each category it has many steps which are from different test cases as shown in FIG. 16.

More particularly, a first category (e.g., "Ci") includes code snippets and corresponding test steps. The code snippets in the first category are determined to be the same as each other code snippet in the first category. The corresponding test steps may be from different manual test cases. In the example shown in FIG. 16, test step1 is from manual test case1, test step2 is from manual test case3, and so forth.

As another example, a second category (e.g., "Cj") includes code snippets and corresponding test steps. The code snippets in the second category are determined to be the same as each other code snippet in the second category. The second category is different from the first category. For example, the code snippets in the second category may have been determined to be different from the code snippets in the first category. The corresponding test steps in the second category may be from different manual test cases. In the example shown in FIG. 16, test step3 is from manual test case5, test step5 is from manual test case 7, and so forth.

Figure 17:
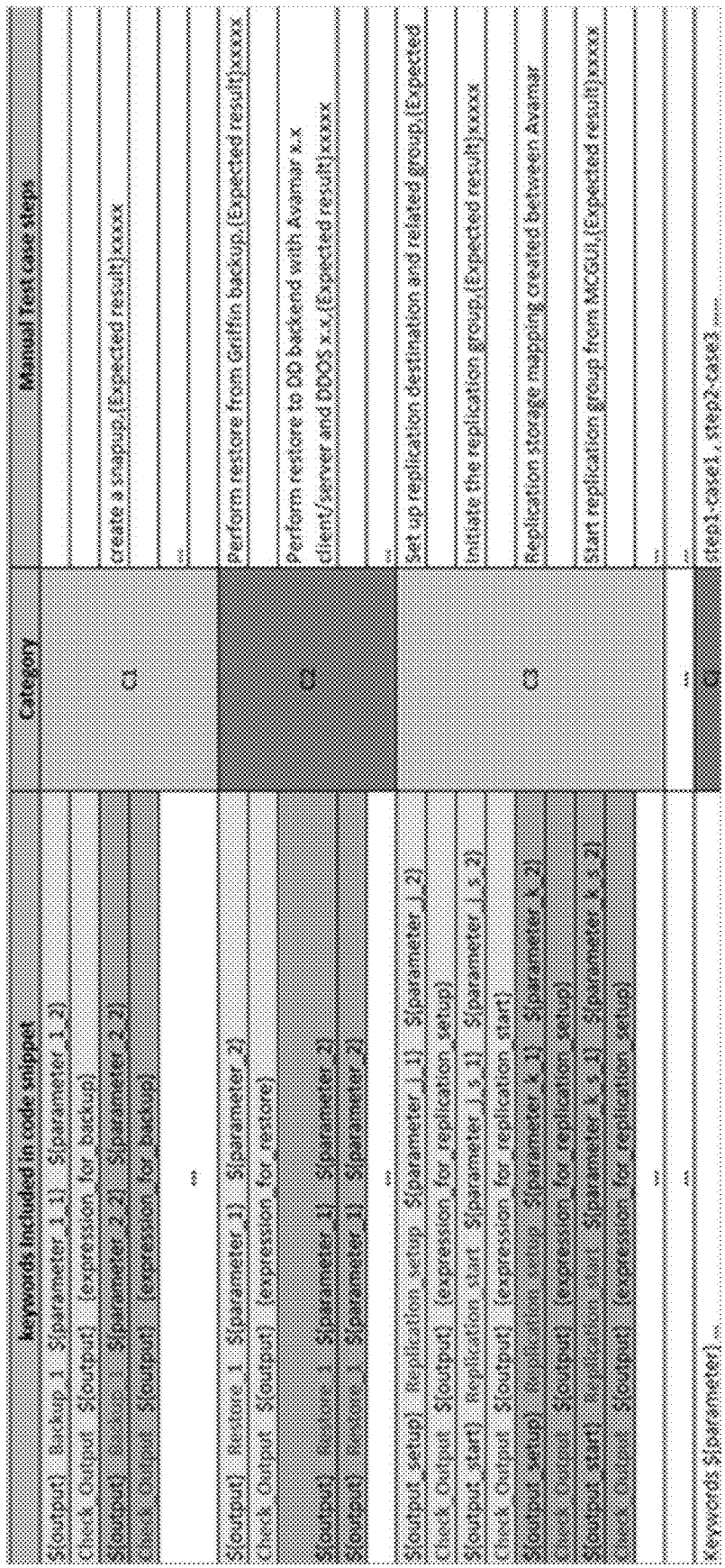
FIG. 17 shows an example of a table with some sample data summarizing a clustering operation, according to one or more embodiments.

FIG. 17 shows an example of a table with some sample data summarizing a result of the clustering operation. A first column of the table lists keywords included in code snippets. For example, words such as "Backup_1," "Check_Output," are the chunks which have been identified as keywords as a result of collecting keywords from the automation libraries into the keywords dictionary. A second column of the table lists the corresponding category that the respective code snippets have been placed into. A third column of the table lists the respective test steps from the corresponding manual test cases.

Referring back now to FIG. 4, in a step 450, existing manual test steps of each category are refined to derive training word segments, each category thereby now also including a training word segment. Specifically, the corpus of test steps from each manual test case is refined using natural language processing (NLP). In a specific embodiment, the refining includes word segmentation which may involve splitting a manual test case step into one or more words and deleting the stopping words.

Word segmentation is a process in which meaningful units or terms in a line or block of text is identified. These meaningful units may include words, clauses, phrases, sentences, topics, or combinations of these. A word segmentation algorithm may include, for example, examining spaces in a line of text to identify meaningful units, parts-of-speech (POS) tagging, named entity recognition (NER), tokenization, punctuation splitting, separation of affixes (e.g., possessives), and so forth. POS tagging, for example, may include assigning a parts of speech to a word or other token (e.g., noun, verb, adjective, and so forth). Any competent word segmentation algorithm may be used to process the existing manual test steps to derive sets of valid or meaningful words.

More particularly, the text of each test step is refined to obtain multiple valid or meaningful words such as $\{w_1, w_2 \ldots\}$. Assume, for example, a vector $T=\{w_1, w_2 \ldots\}$. Thus, for each category C, it has a set of T. These T may be referred to as training word segments that are used to train the text classifier.

FIG. 18 shows an example of refining existing manual test steps to generate a vector T (e.g., training word segments for the text classifier). Vector T may be extracted from one or more manual test case steps. In the example of FIG. 18, there is a first manual test case step T1 1805, and a second manual test case step T2 1810. The first manual test case step includes a first block of text 1815 that reads "Create a full backup." The second manual test case step includes a second block of text 1820 that reads "perform L1 backup without any changes." The test steps are refined, such as by applying a word segmentation algorithm and deleting stopping words, to generate a vector T 1825.

As shown in the example of FIG. 18, vector T includes a first set of valid or meaningful words 1830, and a second set of valid or meaningful words 1835. The first set of valid words have been derived from refining the first manual test case step (and, more particularly, the first block of text corresponding to the first manual test case step). The second set of valid words have been derived from refining the second manual test case step (and, more particularly, the second block of text corresponding to the second manual test case step). For example, as shown in FIG. 18, the words "create," "full," "backup," and so forth form the "w" as described.

Refining the corpus such as by segmenting words and deleting stopping words facilitates the application of the Naïve Bayes algorithm. The Bayes algorithm uses categorical rather than numeric data. The refining, clustering, or both provides data for the Bayes model in a discretized format so as to have only categorical values. More particularly, in an embodiment, the tool calculates the occurrences of each particular word in each particular category for the entire corpus. Word segmentation and deletion help to ensure that the model is not skewed. For example, stopping words (e.g., "the," "a," "be," "by," and so forth), are words that may be considered irrelevant for classification purposes because they occur very frequently in natural language. Thus, stop words are not valuable for the text classification and, indeed, can impact the precision of the algorithm by introducing noise into the classification process. Thus, stop words may be deleted, removed, or ignored before applying the Naïve Bayes (or other) classification algorithm.

FIG. 19 shows a mathematical representation of vector T or training word segments 1910 and corresponding code snippet categories 1915. As shown in the example of FIG. 19, each vector T may include any number of different words for a code snippet category. For example, a first code snippet category 1920A may include, be mapped to, be associated with, or correspond to any number of training word segments. In this example, the first code snippet category includes a first training word segment 1925A, fourth training word segment 1925D, and fifth training word segment 1925E which, in turn, have been derived from first, fourth, and fifth manual test steps, respectively. Any of the first, fourth, and fifth manual test steps may be from a same or different manual test case. For example, the first manual test step may be from a first manual test case. The fourth manual test step may be from a second manual test case, different from the first manual test case.

Similarly, a second code snippet category 1920B may include, be mapped to, be associated with, or correspond to any number of training word segments. In this example, the second code snippet category includes a second training word segment 1925B, third training word segment 1925C, and seventh training word segment 1925G which, in turn, have been derived from second, third, and seventh manual test steps, respectively. Any of the second, third, and seventh manual test steps may be from a same or different manual test case. For example, the second manual test step may be from the first manual test case. The third manual test step may be from a third manual test case, different from the first manual test case. And so forth.

Figure 20:
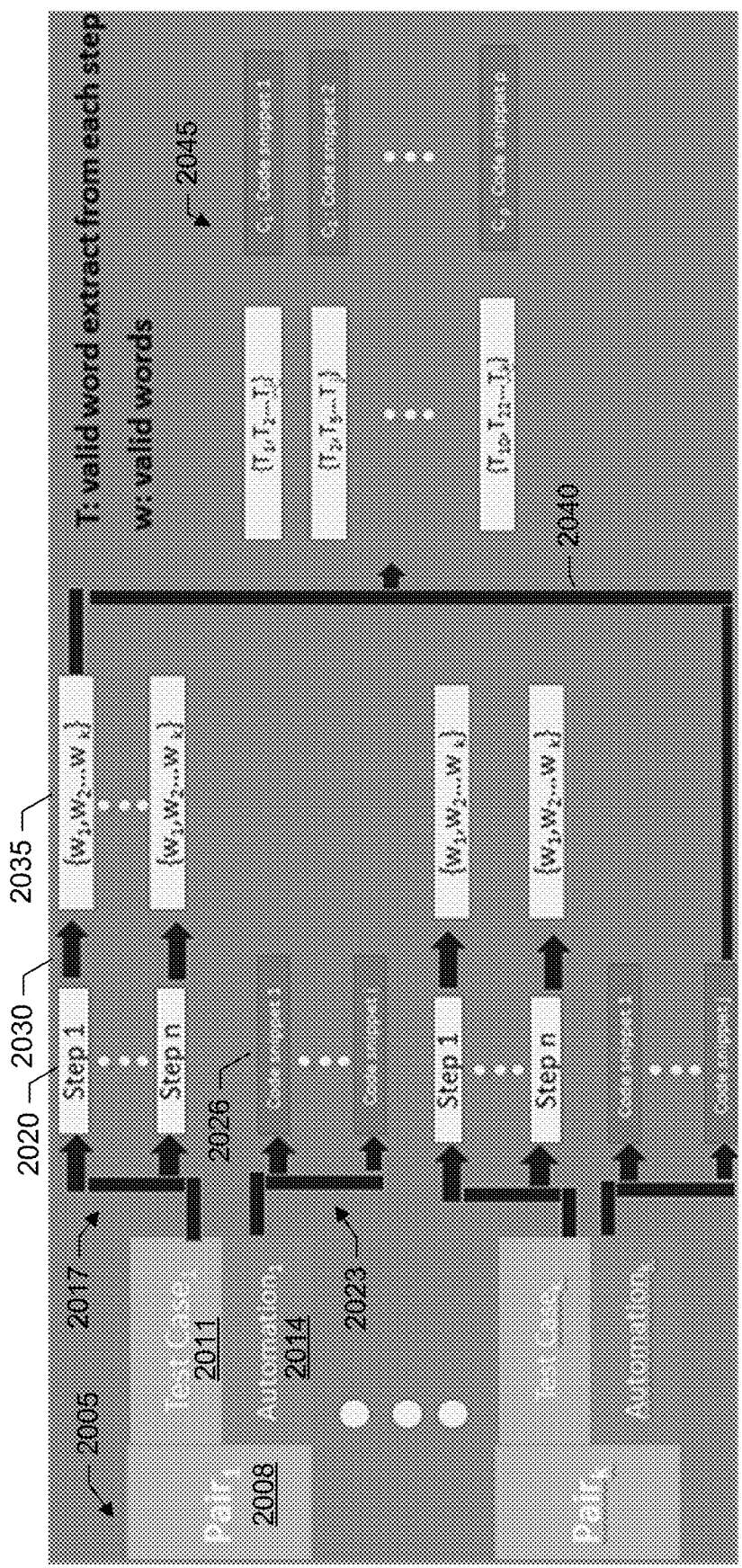
FIG. 20 shows a graphical representation of processes of a sample processor to generate training data, according to one or more embodiments.

FIG. 20 shows a graphical representation of processes of the sample processor to generate samples 2045. As shown in the example of FIG. 20, there are a set of pairs 2005 from a corpus of existing manual test cases and corresponding existing automation cases. Specifically, each pair includes a test case (e.g., manual test case) mapped to a corresponding automation case (e.g., automated test script). For example, a first pair 2008 includes a first test case 2011 that is mapped to a first automation case 2014. The first automation case includes executable code to perform the first test case automatically.

Test steps from the test cases are extracted 2017. For example, test steps 1 . . . n 2020 are extracted from the first test case. The automation code is split into code snippets. For example, the first automation case is split 2023 into code snippets 1 . . . i 2026.

The test steps are refined using word segmentation, stopping words deletion, and so forth to produce a set of valid or meaningful words for each test step. For example, step 1 from the first test case is refined 2030 to produce valid words $w_1, w_2 \ldots w_k$ 2035. These valid or meaningful words may be referred to as training word segments.

The code snippets are clustered to produce 2040 code snippet categories $C_1, C_2, \ldots C_p$ 2045. Each category is associated with a code snippet from an automation case and includes other code snippets determined to match each other. Each category of code snippet is further associated with a corresponding set of training word segments, where a training word segment includes valid or meaningful words from a test step corresponding to a code snippet.

Figure 21:
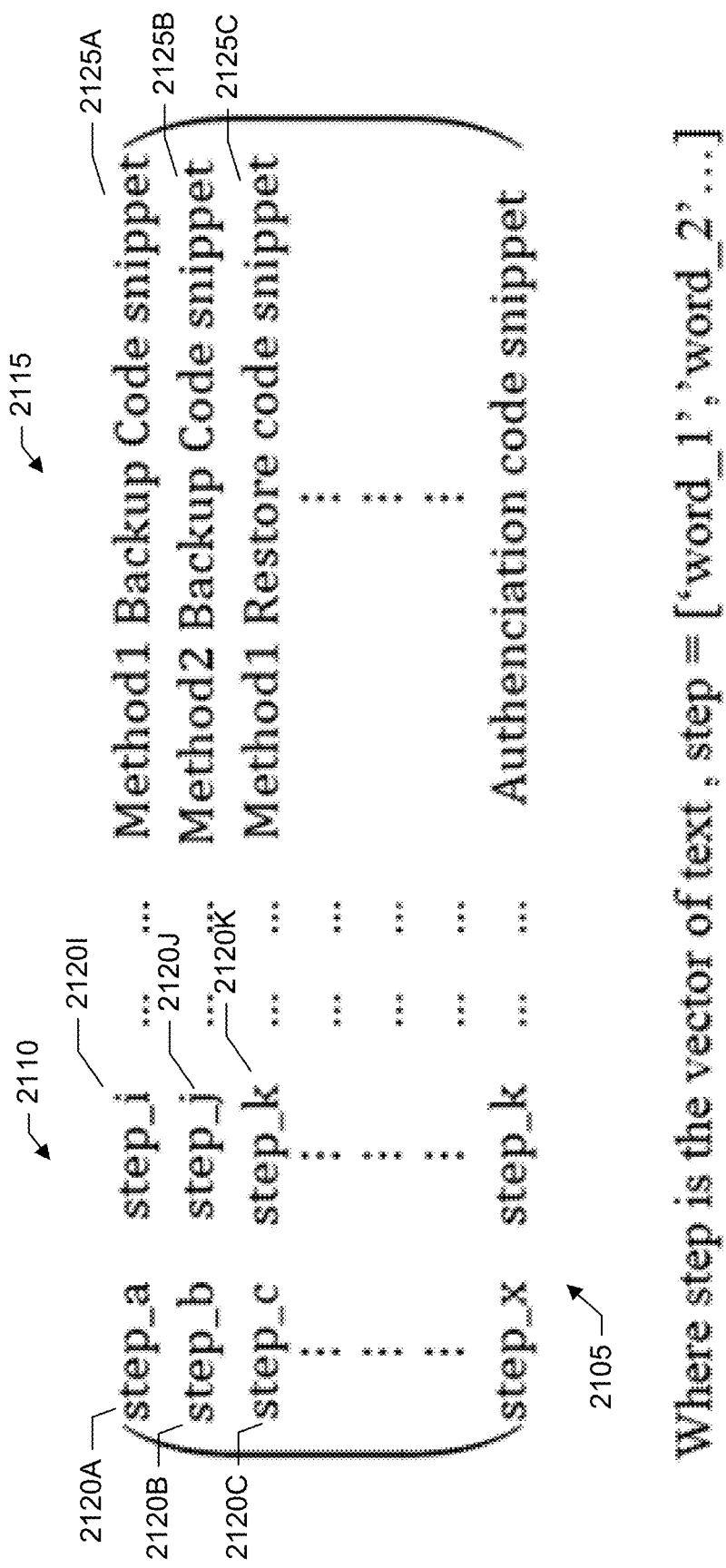
FIG. 21 shows an example of a matrix to map steps to their corresponding code snippet categories, according to one or more embodiments.

FIG. 21 shows an example of a matrix 2105 that may be created to associate or map steps 2110 to their corresponding code snippet categories 2115, where a step is a vector of text, e.g., step=["word_1," "word_2," . . . ]. For example, a first row of the matrix includes a first vector of text 2120A and a ninth vector of text 21201, each of which are mapped to a first code snippet category 2125A. A second row of the matrix includes a second vector of text 2120B and a tenth vector of text 2120J, each of which are mapped to a second code snippet category 2125B. A third row of the matrix includes a third vector of text 2120C and an eleventh vector of text 2120K, each of which are mapped to a third code snippet category 2125C. And so forth. As discussed, different test steps from different manual test cases may be mapped to a same code snippet category.

Figure 22:
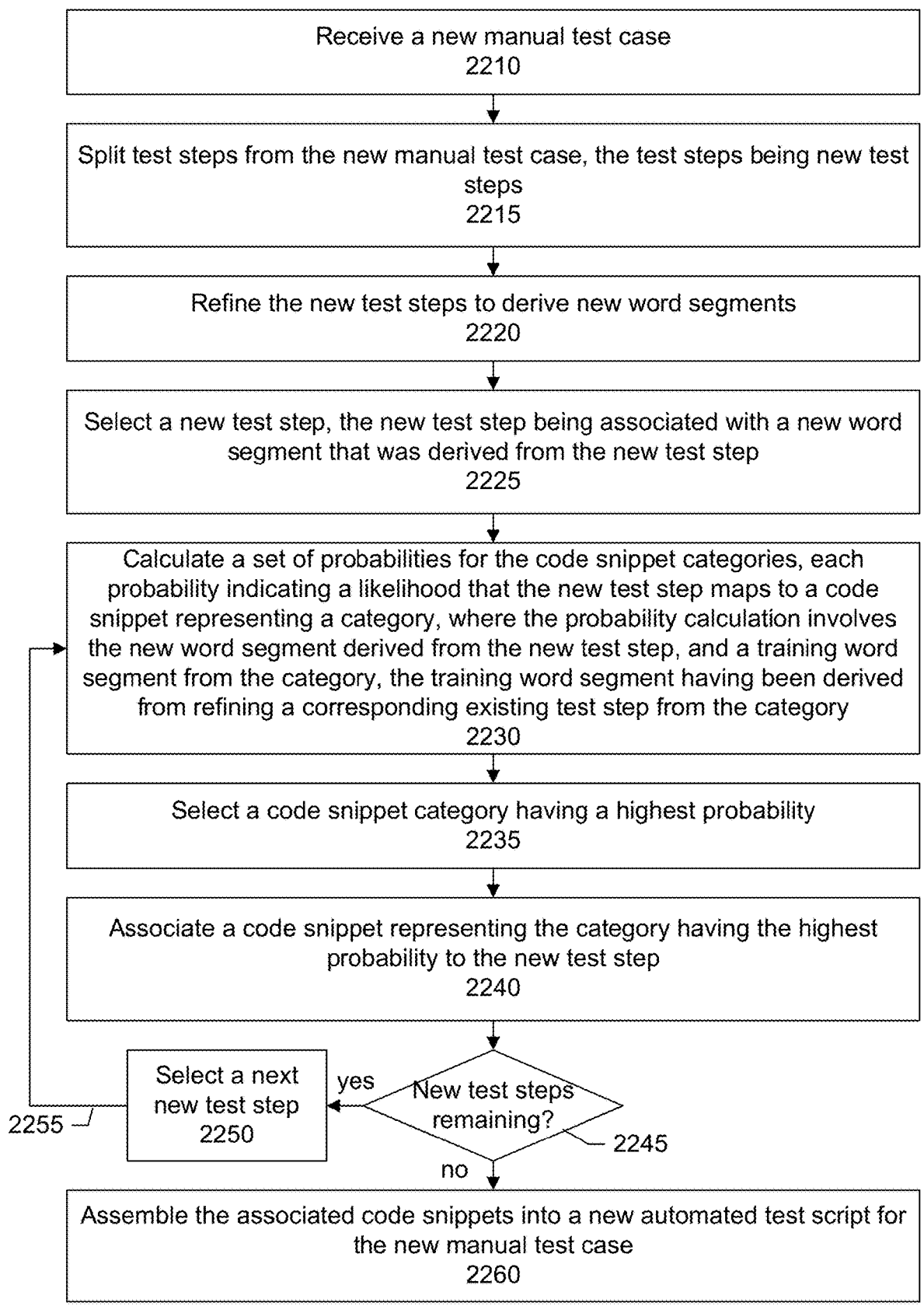
FIG. 22 shows a flow of a text classifier to generate a new automated test script, according to one or more embodiments.

FIG. 22 shows a flow of the text classifier to generate a new automated test script based on a new manual test case. In an embodiment, the text classifier uses the Naïve Bayes algorithm to calculate the probability that a new test step from the new manual test case belongs in each of the code snippet categories, given a set of refined (e.g., valid or meaningful) words from the new test step. The code snippet category having the highest probability is selected and the new test step is associated with a code snippet from or representing the selected code snippet category.

More particularly, depending on factors such as the size of the corpus of existing test cases and corresponding automated test scripts, there may be many hundreds, thousands, millions, or even more code snippet categories. The code snippet category with the highest probability is selected. The new test step is associated with a representative code snippet from the selected code snippet category. The probability calculation (and code snippet selection, and code snippet association operations) are repeated for each other remaining new test step from the new manual test case. When these operations have completed, there will be a subset of particular code snippets from among the corpus will have been associated to the respective new test steps from the new manual test case. The subset of code snippets may be then be combined or assembled according to the ordering of the new test steps in the new manual test case to produce a new automated test script.

Consider, as an example, that a new manual test case includes first, second, and third test steps; and there are first, second, third, fourth, and fifth code snippet categories. The first code snippet category is different from the second, third, fourth, and fifth code snippet categories. The second code snippet category is different from the third, fourth, and fifth code snippet categories. The third code snippet category is different from the fourth, and fifth code snippet categories. The fourth code snippet category is different from the fifth code snippet category.

A first probability is calculated indicating a likelihood that the first test step belongs in the first code snippet category. A second probability is calculated indicating a likelihood that the first test step belongs in the second code snippet category. A third probability is calculated indicating a likelihood that the first test step belongs in the third code snippet category. A fourth probability is calculated indicating a likelihood that the first test step belongs in the fourth code snippet category. A fifth probability is calculated indicating a likelihood that the first test step belongs in the fifth code snippet category.

The probabilities are compared to each other and the first test step is associated with the code snippet category having the highest probability from among the first, second, third, fourth, and fifth probabilities.

The process is then repeated for each remaining test step. In other words, a first probability is recalculated indicating a likelihood that the second test step belongs in the first code snippet category. A second probability is recalculated indicating a likelihood that the second test step belongs in the second code snippet category. A third probability is recalculated indicating a likelihood that the second test step belongs in the third code snippet category. A fourth probability is recalculated indicating a likelihood that the second test step belongs in the fourth code snippet category. A fifth probability is recalculated indicating a likelihood that the second test step belongs in the fifth code snippet category.

The probabilities are again compared to each other and the second test step is associated with the code snippet category having the highest probability from among the recalculated first, second, third, fourth, and fifth probabilities.

Similarly, a first probability is recalculated indicating a likelihood that the third test step belongs in the first code snippet category. A second probability is recalculated indicating a likelihood that the third test step belongs in the second code snippet category. A third probability is recalculated indicating a likelihood that the third test step belongs in the third code snippet category. A fourth probability is recalculated indicating a likelihood that the third test step belongs in the fourth code snippet category. A fifth probability is recalculated indicating a likelihood that the third test step belongs in the fifth code snippet category.

The probabilities are again compared to each other and the third test step is associated with the code snippet category having the highest probability from among the recalculated first, second, third, fourth, and fifth probabilities.

After the all test steps have been associated with their respective code snippets, the code snippets are assembled into a new automated test script according to the ordering of the test steps from the new test case. For example, the new automated test script may include first, second, and third code snippets associated with the first, second, and third test steps. The first code snippet may appear or be positioned at a top of a file for the new automated test script. The second code snippet may appear below the first code snippet and above the third code snippet (e.g., between the first and third code snippets). The third code snippet may appear below the second code snippet. The first, second, and third code snippets may be assembled, combined, or placed into a single new automated test script file. In other words, a single file may include the first, second, and third code snippets.

More particularly, in a step 2210, a new manual test case is received or obtained. At a time that the new manual test case is received or obtained, an automated test script may not yet exist. In a step 2215, test steps from the new manual test case are split or extracted from the new manual test case, the test steps thereby being new test steps. In a step 2220, the new test steps are refined to derive new word segments. As discussed, the refining may include word segmentation, stopping word deletion, or both to generate valid or meaningful units. Each new test step may then have a corresponding new word segment. In an embodiment, the sample processor is reused to process the new manual test case by extracting and refining the new test steps of the new test case in a manner similar to that used to process the corpus of existing manual test cases.

In a step 2225, a new test step is selected, the new test step being associated with a new word segment that was derived from the new test step. In a step 2230, a set of probabilities are calculated for the code snippet categories. Each probability indicates a likelihood that the new test step maps to a code snippet representing or from a code snippet category. The probability calculation involves the new word segment derived from the new test step, and a training word segment from the code snippet category. The training word segment is derived from refining an existing test step that corresponds to a code snippet from the code snippet category.

In a step 2235, a code snippet category having a highest probability is selected. In a step 2240, a code snippet representing the code snippet category having the highest probability is associated to the new test step. In a step 2245, a determination is made as to whether there are any new test steps remaining (e.g., new test steps that have not yet been associated to code snippets). If there is a new test step remaining, the remaining new test step is selected (step 2250) and the process loops back 2255 to determine which code snippet should be associated to the remaining new test step.

Alternatively, if there are no other new test steps remaining, the code snippets associated to the new test steps of the new manual test case are assembled or combined into a new automated test script for the new manual test case (step 2260). That is, the various code snippets may be placed into a single new automated test script file. This new file may also be updated to include a test case ID of the new manual test case so that new manual test case and new automated test script file can be mapped to each other. For example, the test case ID may be stored in a header of the new automated test script file, in a first line of the new automated test script file, or any other standard location or position.

More specifically, assume, for example, that Tx is the input text. In an embodiment, Tx corresponds to a test step from the new manual test case where the test step has been refined (e.g., word segmentation and stopping word deletion applied). That is, Tx includes multiple valid or meaningful words {w1~wx} after processing by sample processor. The input text will be classified to a specified code snippet by the Naïve Bayes algorithm. This algorithm may be expressed by the formula shown in FIG. 23 as a mathematic model.

Thus, a next step is to then calculate the result of the formula shown in FIG. 23 for each kind of code snippet. The tool (or text classifier) calculates the probability that Tx belongs in each of the code snippet categories (e.g., calculate a first probability that Tx belongs in a first code snippet category, calculate a second probability that Tx belongs in a second code snippet category, different from the first code snippet category, calculate a third probability that Tx belongs in a third code snippet category, different from the first and second code snippet categories, and so forth).

In other words, P(C|Tx) is the probability that Tx maps to one specified code snippet C. Where P(C) and P(Wx) is the prior probability in Bayesian theory.

P(w|C) is the probability that the one specified code snippet contains the word w; and the probability may be calculated using the following formula shown in FIG. 24.

In FIG. 24, the variable "#(occurrences for w in C)" represents the total number of the word w occurrences in the category C. The variable "#(sum of the occurrences for all sample words in category C)" represents the total number of occurrences for all words in category C.

The algorithm of text classifier compares the P(C|Tx) for each category{C1 . . . Cp} and determines the maximum probability. This determination may be expressed as shown in FIG. 25. The formula shown in FIG. 25 can be simplified as shown in FIG. 26.

In a specific embodiment, a data smoothing operation may be applied in case of new words in the input text that was not seen or present in the training samples. In a specific embodiment, the algorithm of the text classifier assigns a tiny or small probability to these unseen words to avoid the $P(C|Tx)=0$. So $P(C|Tx)$ can be updated as shown in FIG. 27. In FIG. 27, the variable "#(all unique words in all categories)" represents the total number of all unique words in category C.

To prove operability, a prototype was constructed of the tool and model. The prototype was tested and found to be operable. Specifically, experimental data for the prototype was collected and included existing manual test cases and corresponding automated test cases developed for a backup application. For purposes of simplification, the number of code snippet categories were limited to three kinds of code snippets. A first kind of code snippet included keywords for backup. A second kind of code snippet included keywords for restore. A third kind of code snippet included keywords for replication. There were 209 sentences to describe the first kind of code snippet ("backup" keyword; 257 sentences for the second kind of code snippet ("restore"), and 50 sentences for the third kind of code snippet ("replication").

As shown in FIG. 26 and described in the discussion accompanying FIG. 26, the formula shown in table H was evaluated and values compared.

TABLE H

| Argmax $P(C_i|Tx) \propto P(w_1|C_i) ... P(w_x|C_i)P(C_i)$; i = 1,2,3 |
|---|

Table I below shows a detail of information for the experimental data.

TABLE I

| | Backup #(backup) | Restore #(restore) | Replication #(replication) | Total #(total) |
|---|---|---|---|---|
| Quantities of each Code snippet sample(manual test case steps) | 209 | 257 | 50 | 516 |
| All unique words in each kinds of code snippet | 219 | 261 | 30 | 510 |
| $P(C_i)$ | #(backup)/ #(total) ≈0.405 | #(restore)/ #(total) ≈0.498 | #(replication)/ #(total) ≈0.097 | 1 |

Table I above includes frequencies and probabilities. $P(w|C)$ can be updated as shown in table J below according to table I above.

TABLE J $$P(w|C) = \frac{\#(\text{occurrences for } w \text{ in } C) + 1}{\#(\text{sum of the occurrences for all sample words in Category } C) + 510}$$

Tables K and L show results of a test of the prototype using the model built with the training data. The input text was collected from a variety of different internal development teams. In the tables below, the $P(C_i|Tx)$ shown between asterisks, i.e., "*", is the most likely or best code snippet for the input text.

TABLE K

| | Input Text | | |
|---|---|---|---|
| $P(C_i|Tx)$ | "perform L1 backup without any changes" | "restore the latest backup to same location" | "Replicate all the backups for first client from source to target" |
| Backup | *1.04047220578e−11* | 2.72187529033e−10 | 1.61548513326e−17 |
| Restore | 4.51219023039e−13 | *5.2016831657e−08* | 2.15130189042e−17 |
| Replication | 6.63038660407e−13 | 5.05566978561e−11 | *5.24064514959e−16* |

TABLE L

| | Input Text | | |
|---|---|---|---|
| $P(C_i|Tx)$ | "do full ndmp backup" | "Browse the backups on destination under the/REPLICATE domain and the corresponding client and restore a backup" | "Replicate the client to the destination again" |
| Backup | *6.92263615507e−08* | 6.71004947488e−24 | 1.6884478427e−09 |
| Restore | 5.25174194595e−09 | *6.83972072675e−23* | 5.85194102549e−09 |
| Replication | 3.08395856922e−08 | 5.3873108391e−24 | *3.965089589e−08* |

Figure 28:
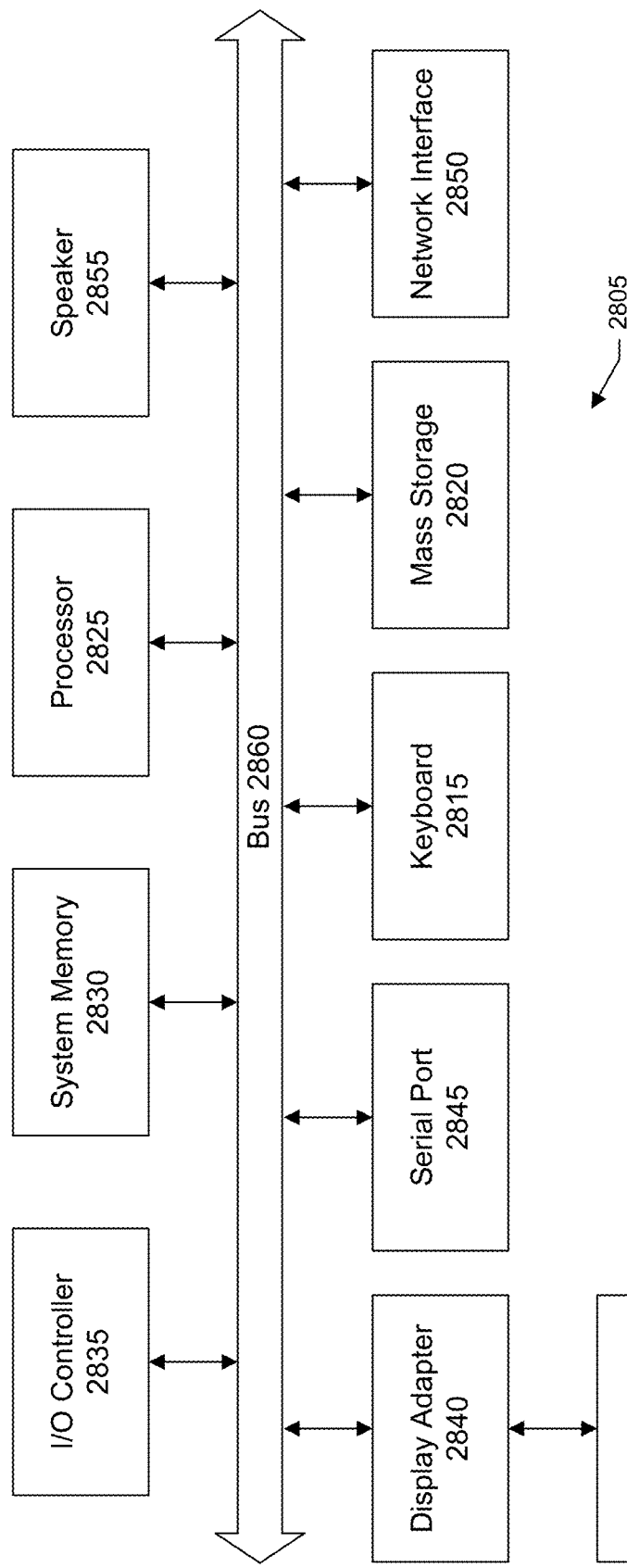
FIG. 28 shows a block diagram of a computer system suitable for use with the system, according to one or more embodiments.

FIG. 28 shows a system block diagram of a computer system 2805 used to execute the software of the present system described herein. The computer system includes a monitor 2807, keyboard 2815, and mass storage devices 2820. Computer system 2805 further includes subsystems such as central processor 2825, system memory 2830, input/output (I/O) controller 2835, display adapter 2840, serial or universal serial bus (USB) port 2845, network interface 2850, and speaker 2855. The system may also be used with computer systems with additional or fewer subsystems. For example, a computer system could include more than one processor 2825 (i.e., a multiprocessor system) or a system may include a cache memory.

Arrows such as 2860 represent the system bus architecture of computer system 2805. However, these arrows are illustrative of any interconnection scheme serving to link the subsystems. For example, speaker 2855 could be connected to the other subsystems through a port or have an internal direct connection to central processor 2825. The processor may include multiple processors or a multicore processor, which may permit parallel processing of information. Computer system 2805 shown in FIG. 28 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, there is a system comprising: a processor; and memory configured to store one or more sequences of instructions which, when executed by the processor, cause the processor to carry out the steps of: creating a mapping between a plurality of test steps split from existing manual test cases and a plurality of code snippets split from existing automated test scripts for the existing manual test cases; clustering the plurality of code snippets into categories, each category comprising a subset of code snippets that are determined to match each other, and a corresponding subset of the plurality of test steps according to the mapping; refining the subset of test steps in each category to generate training word segments for each category; receiving a new manual test case to automate; splitting the new manual test case into a plurality of new test steps; refining the plurality of new test steps to generate new word segments; calculating a plurality of probabilities for the plurality of categories, each probability indicating a likelihood that a new test step belongs in a particular category, and each probability being based on a training word segment associated with the particular category, and a new word segment derived from refining the new test step; identifying a category having a highest probability; mapping the new test step to a code snippet from the category having the highest probability; and repeating the calculating, identifying, and mapping for each other new test step from the new manual test case to generate a new automated test script for the new manual test case.

In an embodiment, the plurality of test steps and the plurality of new test steps are in a natural language format.

In an embodiment, the refining the subset of test steps in each category to generate training word segments for each category comprises: segmenting words from the test steps and deleting stopping words from the test steps to identify meaningful units of one or more words, the meaningful units being the training word segments.

In an embodiment, the refining the plurality of new test steps to generate new word segments comprises: segmenting words from the new test steps and deleting stopping words from the new test steps to identify meaningful units of one or more words, the meaningful units being the new word segments. In an embodiment, the plurality of probabilities are calculated according to a Naïve Bayes algorithm.

In an embodiment, the clustering the plurality of code snippets into categories comprises: collecting keywords into a dictionary, each keyword comprising code; chunking a first code snippet into a first plurality of chunks; comparing the first plurality of chunks to the keywords in the dictionary; placing chunks of the first plurality of chunks that match the keywords in the dictionary into a first code snippet keyword list; chunking a second code snippet into a second plurality of chunks; comparing the second plurality of chunks to the keywords in the dictionary; placing chunks of the second plurality of chunks that match the keywords in the dictionary into a second code snippet keyword list; comparing the first and second code snippet keywords lists to each other; if the first code snippet keyword list matches the second code snippet keyword list, clustering the first code snippet and the second code snippet into a same category; and if the first code snippet keyword list does not match the second code snippet keyword list, clustering the first code snippet and the second code snippet into different categories.

In another specific embodiment, there is a method comprising: creating a mapping between a plurality of test steps split from existing manual test cases and a plurality of code snippets split from existing automated test scripts for the existing manual test cases; clustering the plurality of code snippets into categories, each category comprising a subset of code snippets that are determined to match each other, and a corresponding subset of the plurality of test steps according to the mapping; refining the subset of test steps in each category to generate training word segments for each category; receiving a new manual test case to automate; splitting the new manual test case into a plurality of new test steps; refining the plurality of new test steps to generate new word segments; calculating a plurality of probabilities for the plurality of categories, each probability indicating a likelihood that a new test step belongs in a particular category, and each probability being based on a training word segment associated with the particular category, and a new word segment derived from refining the new test step; identifying a category having a highest probability; mapping the new test step to a code snippet from the category having the highest probability; and repeating the calculating, identifying, and mapping for each other new test step from the new manual test case to generate a new automated test script for the new manual test case.

In another specific embodiment, there is a computer program product, comprising a non-transitory computer-readable medium having a computer-readable program code embodied therein, the computer-readable program code adapted to be executed by one or more processors to implement a method comprising: creating a mapping between a plurality of test steps split from existing manual test cases and a plurality of code snippets split from existing automated test scripts for the existing manual test cases; clustering the plurality of code snippets into categories, each category comprising a subset of code snippets that are determined to match each other, and a corresponding subset of the plurality of test steps according to the mapping; refining the subset of test steps in each category to generate training word segments for each category; receiving a new manual test case to automate; splitting the new manual test case into a plurality of new test steps; refining the plurality of new test steps to generate new word segments; calculating a plurality of probabilities for the plurality of categories, each probability indicating a likelihood that a new test step belongs in a particular category, and each probability being based on a training word segment associated with the particular category, and a new word segment derived from refining the new test step; identifying a category having a highest probability; mapping the new test step to a code snippet from the category having the highest probability; and repeating the calculating, identifying, and mapping for each other new test step from the new manual test case to generate a new automated test script for the new manual test case.

In another specific embodiment, there is a method comprising: splitting sets of existing manual test cases and automated test scripts, corresponding to the set of existing manual test cases, into to a plurality of test steps and a plurality of code snippets, respectively; creating a mapping between the plurality of test steps and the plurality of code snippets; clustering the plurality of code snippets into categories, each category comprising a subset of code snippets that are determined to match each other, and a corresponding subset of the plurality of test steps according to the mapping; refining the subset of test steps in each category to generate training word segments for each category; receiving a new manual test case to automate; splitting the new manual test case into a plurality of new test steps; refining the plurality of new test steps to generate new word segments; calculating a plurality of probabilities for the plurality of categories, each probability indicating a likelihood that a new test step belongs in a particular category, and each probability being based on a training word segment associated with the particular category, and a new word segment derived from refining the new test step; identifying a category having a highest probability; mapping the new test step to a code snippet from the category having the highest probability; and repeating the calculating, identifying, and mapping for each other new test step from the new manual test case to generate a new automated test script for the new manual test case.

In another specific embodiment, there is a method comprising: receiving a set of manual test cases, and a set of automation scripts corresponding to the manual test cases, the manual test cases comprising test steps described in a natural language format; extracting the test steps from the test cases; splitting the automation scripts into code snippets; creating a mapping between the extracted test steps and the code snippets; clustering the code snippets into categories, each category comprising a subset of code snippets that are determined to match each other, and a corresponding subset of extracted test steps according to the mapping, each category thereby being represented by a categorized code snippet; segmenting the extracted test steps of each category into training word segments, each category thereby being associated with a training word segment; receiving a new manual test case to automate, the new manual test case comprising new test steps described in the natural language format; extracting the new test steps from the new manual test case; segmenting the new test steps into new word segments; calculating probabilities for the categories, each probability calculation indicating a likelihood that a new test step extracted from the new manual test case maps to a categorized code snippet representing a particular category, and each probability calculation being based on a training word segment associated with the particular category and a new word segment derived from the new test step; identifying a highest probability from among the calculated probabilities; mapping the new test step to a categorized code snippet having the highest probability; and repeating the calculating, identifying, and mapping for each other new test step from the new manual test case to assemble a new automation script for the new manual test case.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A system comprising: a processor; and memory storing one or more sequences of instructions which, when executed by the processor, cause the processor to carry out the steps of:

creating a mapping between a plurality of test steps split from existing manual test cases and a plurality of code snippets split from existing automated test scripts for the existing manual test cases;

clustering the plurality of code snippets into categories, each category comprising a subset of code snippets that are determined to match each other, and a corresponding subset of the plurality of test steps according to the mapping;

refining the subset of test steps in each category to generate training word segments for each category;

receiving a new manual test case to automate;

splitting the new manual test case into a plurality of new test steps;

refining the plurality of new test steps to generate new word segments;

calculating a plurality of probabilities for the plurality of categories, each probability indicating a likelihood that a new test step belongs in a particular category, and each probability being based on a training word segment associated with the particular category, and a new word segment derived from refining the new test step;

identifying a category having a highest probability;

mapping the new test step to a code snippet from the category having the highest probability; and repeating the calculating, identifying, and mapping for each other new test step from the new manual test case to generate a new automated test script for the new manual test case.

2. The system of claim 1 wherein the plurality of test steps and the plurality of new test steps are in a natural language format.

3. The system of claim 1 wherein the refining the subset of test steps in each category to generate training word segments for each category comprises:

segmenting words from the test steps and deleting stopping words from the test steps to identify meaningful units of one or more words, the meaningful units being the training word segments.

4. The system of claim 1 wherein the refining the plurality of new test steps to generate new word segments comprises:

segmenting words from the new test steps and deleting stopping words from the new test steps to identify meaningful units of one or more words, the meaningful units being the new word segments.

5. The system of claim 1 wherein the plurality of probabilities are calculated according to a Naïve Bayes algorithm.

6. The system of claim 1 wherein the clustering the plurality of code snippets into categories comprises:

collecting keywords into a dictionary, each keyword comprising code;

chunking a first code snippet into a first plurality of chunks;

comparing the first plurality of chunks to the keywords in the dictionary;

placing chunks of the first plurality of chunks that match the keywords in the dictionary into a first code snippet keyword list;

chunking a second code snippet into a second plurality of chunks;

comparing the second plurality of chunks to the keywords in the dictionary;

placing chunks of the second plurality of chunks that match the keywords in the dictionary into a second code snippet keyword list;

comparing the first and second code snippet keywords lists to each other;

if the first code snippet keyword list matches the second code snippet keyword list, clustering the first code snippet and the second code snippet into a same category; and if the first code snippet keyword list does not match the second code snippet keyword list, clustering the first code snippet and the second code snippet into different categories.

7. A method comprising:

creating a mapping between a plurality of test steps split from existing manual test cases and a plurality of code snippets split from existing automated test scripts for the existing manual test cases;

clustering the plurality of code snippets into categories, each category comprising a subset of code snippets that are determined to match each other, and a corresponding subset of the plurality of test steps according to the mapping;

refining the subset of test steps in each category to generate training word segments for each category;

receiving a new manual test case to automate;

splitting the new manual test case into a plurality of new test steps;

refining the plurality of new test steps to generate new word segments;

calculating a plurality of probabilities for the plurality of categories, each probability indicating a likelihood that a new test step belongs in a particular category, and each probability being based on a training word segment associated with the particular category, and a new word segment derived from refining the new test step;

identifying a category having a highest probability;

mapping the new test step to a code snippet from the category having the highest probability; and repeating the calculating, identifying, and mapping for each other new test step from the new manual test case to generate a new automated test script for the new manual test case.

8. The method of claim 7 wherein the plurality of test steps and the plurality of new test steps are in a natural language format.

9. The method of claim 7 wherein the refining the subset of test steps in each category to generate training word segments for each category comprises:

segmenting words from the test steps and deleting stopping words from the test steps to identify meaningful units of one or more words, the meaningful units being the training word segments.

10. The method of claim 7 wherein the refining the plurality of new test steps to generate new word segments comprises:

segmenting words from the new test steps and deleting stopping words from the new test steps to identify meaningful units of one or more words, the meaningful units being the new word segments.

11. The method of claim 7 wherein the plurality of probabilities are calculated according to a Naïve Bayes algorithm.

12. The method of claim 7 wherein the clustering the plurality of code snippets into categories comprises:

collecting keywords into a dictionary, each keyword comprising code;

chunking a first code snippet into a first plurality of chunks;

comparing the first plurality of chunks to the keywords in the dictionary;

placing chunks of the first plurality of chunks that match the keywords in the dictionary into a first code snippet keyword list;

chunking a second code snippet into a second plurality of chunks;

comparing the second plurality of chunks to the keywords in the dictionary;

placing chunks of the second plurality of chunks that match the keywords in the dictionary into a second code snippet keyword list;

comparing the first and second code snippet keywords lists to each other;

if the first code snippet keyword list matches the second code snippet keyword list, clustering the first code snippet and the second code snippet into a same category; and if the first code snippet keyword list does not match the second code snippet keyword list, clustering the first code snippet and the second code snippet into different categories.

13. A computer program product, comprising a non-transitory computer-readable medium having a computer-readable program code embodied therein, the computer-readable program code adapted to be executed by one or more processors to implement a method comprising:

creating a mapping between a plurality of test steps split from existing manual test cases and a plurality of code snippets split from existing automated test scripts for the existing manual test cases;

clustering the plurality of code snippets into categories, each category comprising a subset of code snippets that are determined to match each other, and a corresponding subset of the plurality of test steps according to the mapping;

refining the subset of test steps in each category to generate training word segments for each category;

receiving a new manual test case to automate;

splitting the new manual test case into a plurality of new test steps;

refining the plurality of new test steps to generate new word segments;

calculating a plurality of probabilities for the plurality of categories, each probability indicating a likelihood that a new test step belongs in a particular category, and each probability being based on a training word segment associated with the particular category, and a new word segment derived from refining the new test step;

identifying a category having a highest probability;

mapping the new test step to a code snippet from the category having the highest probability; and repeating the calculating, identifying, and mapping for each other new test step from the new manual test case to generate a new automated test script for the new manual test case.

14. The computer program product of claim 13 wherein the plurality of test steps and the plurality of new test steps are in a natural language format.

15. The computer program product of claim 13 wherein the refining the subset of test steps in each category to generate training word segments for each category comprises:

segmenting words from the test steps and deleting stopping words from the test steps to identify meaningful units of one or more words, the meaningful units being the training word segments.

16. The computer program product of claim 13 wherein the refining the plurality of new test steps to generate new word segments comprises:

segmenting words from the new test steps and deleting stopping words from the new test steps to identify meaningful units of one or more words, the meaningful units being the new word segments.

17. The computer program product of claim 13 wherein the plurality of probabilities are calculated according to a Naïve Bayes algorithm.

18. The computer program product of claim 13 wherein the clustering the plurality of code snippets into categories comprises:

collecting keywords into a dictionary, each keyword comprising code;

chunking a first code snippet into a first plurality of chunks;

comparing the first plurality of chunks to the keywords in the dictionary;

placing chunks of the first plurality of chunks that match the keywords in the dictionary into a first code snippet keyword list;

chunking a second code snippet into a second plurality of chunks;

comparing the second plurality of chunks to the keywords in the dictionary;

placing chunks of the second plurality of chunks that match the keywords in the dictionary into a second code snippet keyword list;

comparing the first and second code snippet keywords lists to each other;

if the first code snippet keyword list matches the second code snippet keyword list, clustering the first code snippet and the second code snippet into a same category; and if the first code snippet keyword list does not match the second code snippet keyword list, clustering the first code snippet and the second code snippet into different categories.

* * * * *